(12) United States Patent
Aida

(10) Patent No.: US 11,159,264 B2
(45) Date of Patent: Oct. 26, 2021

(54) OPTICAL TRANSMISSION DEVICE AND OPTICAL TRANSMISSION METHOD

(71) Applicant: NEC Corporation, Tokyo (JP)

(72) Inventor: Ryuji Aida, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/971,494

(22) PCT Filed: Mar. 11, 2019

(86) PCT No.: PCT/JP2019/009606
§ 371 (c)(1),
(2) Date: Aug. 20, 2020

(87) PCT Pub. No.: WO2019/176834
PCT Pub. Date: Sep. 19, 2019

(65) Prior Publication Data
US 2020/0412476 A1 Dec. 31, 2020

(30) Foreign Application Priority Data
Mar. 13, 2018 (JP) .............................. JP2018-045090

(51) Int. Cl.
H04B 10/08 (2006.01)
H04J 14/02 (2006.01)
H04Q 11/00 (2006.01)

(52) U.S. Cl.
CPC ...... *H04J 14/0212* (2013.01); *H04Q 11/0005* (2013.01); *H04Q 2011/0013* (2013.01); *H04Q 2011/0016* (2013.01)

(58) Field of Classification Search
CPC .... H04J 14/02; H04J 14/0212; H04J 14/0201; H04B 10/0795; H04B 10/07955;
(Continued)

(56) References Cited

U.S. PATENT DOCUMENTS

2003/0174381 A1 9/2003 Ishiwada et al.
2006/0198583 A1* 9/2006 Oikawa .............. H04Q 11/0005
385/53

(Continued)

FOREIGN PATENT DOCUMENTS

EP 1347331 A2 9/2003
EP 3343804 A1 7/2018
(Continued)

OTHER PUBLICATIONS

International Search Report corresponding to PCT/JP2019/009606 dated May 21, 2019 (one page).

(Continued)

*Primary Examiner* — Hanh Phan

(57) ABSTRACT

In order to provide an optical transmission device capable of implementing the spectral control of WDM signals while taking into account optical component characteristics, an optical transmission device is provided with: a WSS; a wavelength monitor that outputs a signal expressing a first spectrum, which is the spectrum of the WSS optical output; an optical processing unit that subjects the WSS optical output to prescribed processing; a temperature monitor that outputs a signal indicating the temperature of an optical processing means; and a control unit that receives the input of the signal expressing the first spectrum and the signal indicating the temperature, and controls the transmission characteristics of the WSS on the basis of the first spectrum and the temperature.

19 Claims, 18 Drawing Sheets

(58) Field of Classification Search
CPC ........... H04Q 11/0005; H04Q 11/0003; H04Q 11/0062; H04Q 11/0066; H04Q 11/0067; G02B 6/29385; G02B 6/3588
USPC ........ 398/79, 83, 45, 48, 49, 33, 38, 25, 26, 398/27, 158, 159, 162; 385/24, 37, 16, 385/17, 18
See application file for complete search history.

(56) References Cited

U.S. PATENT DOCUMENTS

| | | |
|---|---|---|
| 2010/0040373 A1 | 2/2010 | Maeda |
| 2011/0217037 A1 | 9/2011 | Yoshida et al. |
| 2014/0105601 A1* | 4/2014 | Ooki ................. H04Q 11/0005 398/48 |
| 2014/0348464 A1* | 11/2014 | Kamura .............. H04J 14/0212 385/16 |
| 2015/0030327 A1 | 1/2015 | Kataoka et al. |
| 2015/0098696 A1* | 4/2015 | Oi ...................... H04B 10/0797 398/38 |
| 2016/0315729 A1 | 10/2016 | Tsuzuki |
| 2018/0241472 A1 | 8/2018 | Inada |

FOREIGN PATENT DOCUMENTS

| | | |
|---|---|---|
| JP | 2003-270603 A | 9/2003 |
| JP | 2009-152903 A | 7/2009 |
| JP | 2016-208310 A | 12/2016 |
| WO | WO-2008/126134 A1 | 10/2008 |
| WO | WO-2017/033438 A1 | 3/2017 |
| WO | WO-2017/154454 A1 | 9/2017 |

OTHER PUBLICATIONS

Written Opinion PCT ISA 237 corresponding to PCT/JP2019/009606 dated May 21, 2019 (4 pages).
Extended European Search Report for EP Application No. EP19766493.1 dated Apr. 20, 2021.

* cited by examiner

Fig.6

| TEMPERATURE | WAVELENGTH | CORRECTION AMOUNT |
|---|---|---|
| 0°C | λ1 | +0.5dB |
| | λ2 | +0.2dB |
| | λ3 | +0.3dB |
| 20°C | λ1 | 0dB |
| | λ2 | 0dB |
| | λ3 | 0dB |
| 40°C | λ1 | −0.4dB |
| | λ2 | −0.1dB |
| | λ3 | −0.3dB |

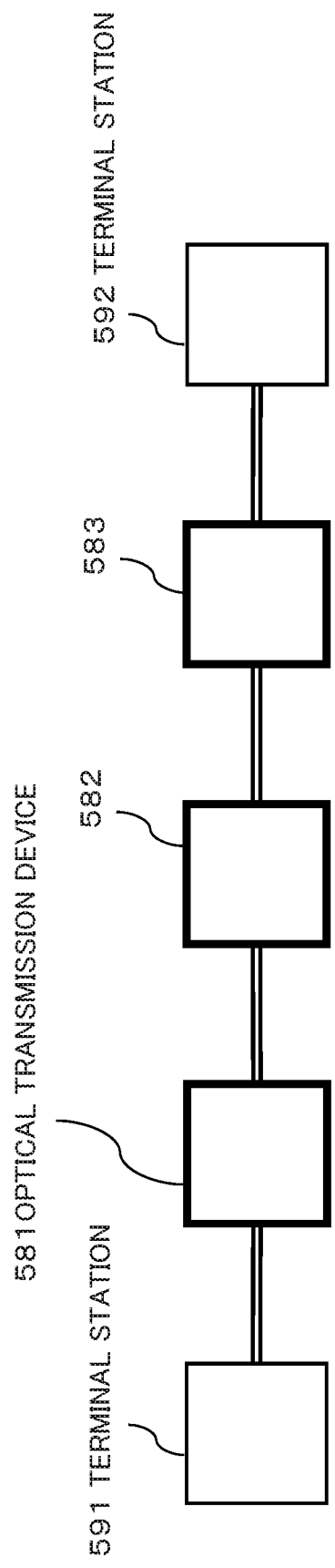

OPTICAL TRANSMISSION DEVICE AND OPTICAL TRANSMISSION METHOD

CROSS REFERENCE TO RELATED APPLICATIONS

This application is a national stage application of International Application No. PCT/JP2019/009606 entitled "Optical Transmission Device and Optical Transmission Method" filed on Mar. 11, 2019, which claims priority to Japanese Patent Application No. JP2018-045090 filed on Mar. 13, 2018, the disclosures of which are hereby incorporated by reference in their entirety.

TECHNICAL FIELD

The present invention relates to an optical transmission device and an optical transmission method, and more particularly to an optical transmission device capable of controlling wavelength characteristics of output light of the optical transmission device, and an optical transmission method for use in the optical transmission device.

BACKGROUND ART

In a wavelength division multiplexing (WDM) optical transmission system, a technique of controlling a wavelength division multiplexing optical signal (hereinafter, referred to as a "WDM signal") on a transmission path in order to improve signal quality is known. For example, PTL 1 describes a technique of correcting insertion loss of a wavelength selective switch included in an optical transmission device. PTL 2 describes a technique of adjusting an output level of an optical amplifier.

Meanwhile, in an undersea cable system, an optical transmission device provided with a wavelength switching function (ROADM function) capable of remotely controlling setting of a communication system after an operation has started, by using a wavelength selective switch (WSS), has been put into practice. WSS is an abbreviation of Wavelength Selective Switch, and ROADM is an abbreviation of Reconfigurable Optical Add/Drop Multiplexing.

CITATION LIST

Patent Literature

[PTL 1] International Publication No. WO2017/154454
[PTL 2] Japanese Unexamined Patent Application Publication No. 2009-152903

SUMMARY OF INVENTION

Technical Problem

In an undersea cable system, an undersea branching device provided with a function (ADD/DROP function) of splitting or coupling a wavelength division multiplexing optical signal is employed. The undersea branching device includes optical components, such as a WSS or an optical amplifier, in order to achieve the ADD/DROP function. Therefore, it is necessary to perform compound control, while taking into account wavelength characteristics of each of the optical components in order to control a spectrum of a WDM signal to be output from the undersea branching device in a desired shape.

OBJECT OF INVENTION

The present invention provides an optical transmission device capable of achieving spectral control of a WDM signal, while taking into account characteristics of an optical component.

Solution to Problem

An optical transmission device according to the present invention includes: a wavelength selective switch (WSS); a wavelength monitor that outputs a signal expressing a first spectrum being a spectrum of output light of the WSS; an optical processing means for performing predetermined processing on output light of the WSS; a temperature monitor that outputs a signal indicating a temperature of the optical processing means; and a control means for receiving a signal expressing the first spectrum and a signal indicating the temperature, and controlling transmission characteristics of the WSS, based on the first spectrum and the temperature.

A control method for an optical transmission device according to the present invention includes: outputting a signal expressing a first spectrum being a spectrum of output light of a wavelength selective switch (WSS); performing predetermined processing on output light of the WSS by using an optical processing means; outputting a signal indicating a temperature of the optical processing means; and controlling transmission characteristics of the WSS, based on the first spectrum and the temperature.

Advantageous Effects of Invention

The present invention provides an advantageous effect that it is possible to set a spectrum of a WDM signal to be output from an optical transmission device to desired characteristics.

BRIEF DESCRIPTION OF DRAWINGS

FIG. 6 is a diagram illustrating an example of a temperature characteristic table.

FIG. 18 is a block diagram illustrating a configuration example of an optical transmission system 20 according to a seventh example embodiment.

EXAMPLE EMBODIMENT

Figure 1:
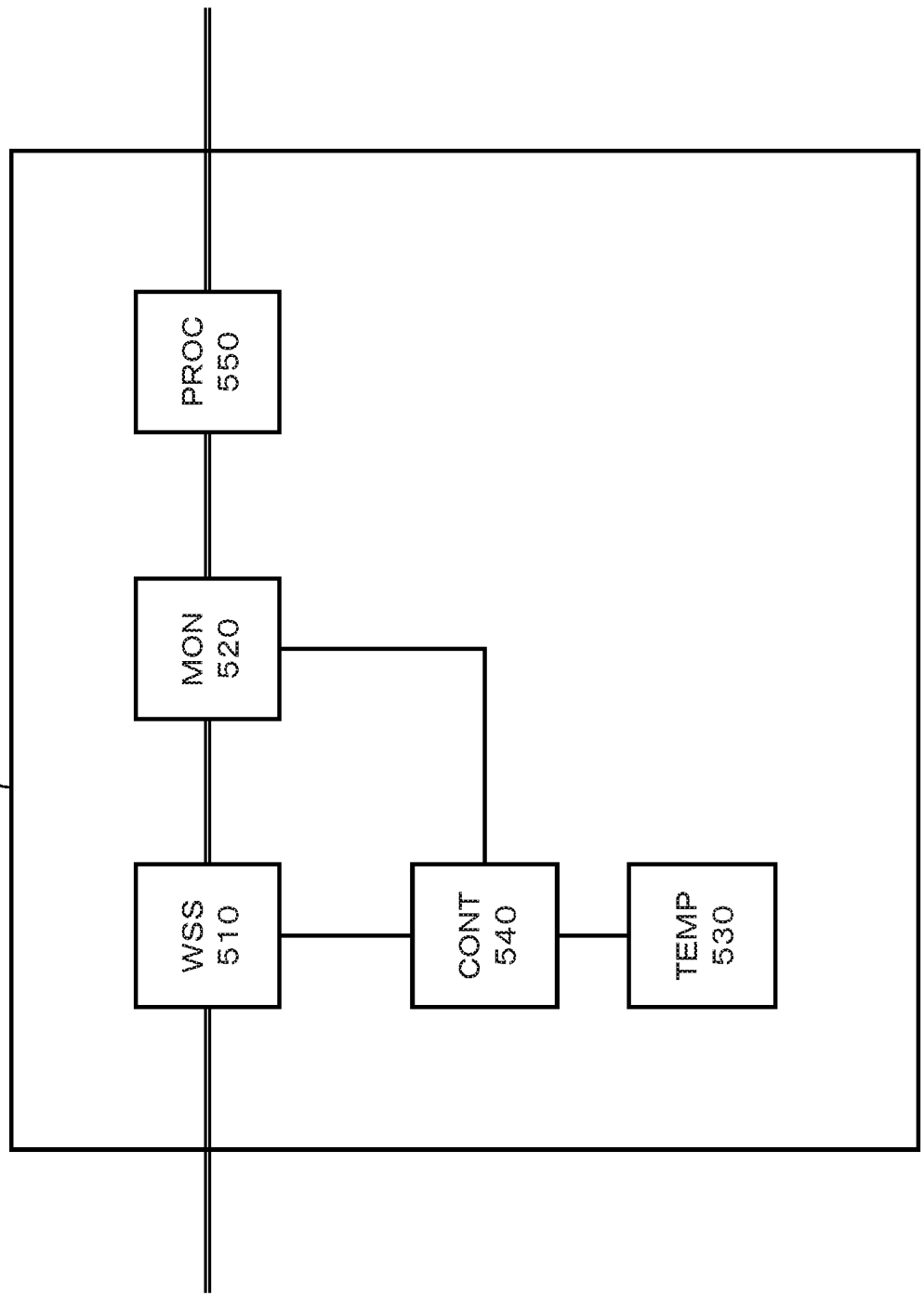
FIG. 1 is a block diagram illustrating a configuration example of an optical transmission device 501 according to a first example embodiment.

Example embodiments according to the present invention are described in the following. Arrows in the drawings are exemplarily attached in order to describe directions of signals in the example embodiments, and do not mean that directions of signals are limited. An intersection of straight lines indicating paths of signals in each block diagram does not mean coupling and branching of signals that intersect with each other, unless otherwise specifically mentioned. In each of the drawings, elements that are already mentioned are indicated with same reference signs, and overlapping description thereof is omitted.

First Example Embodiment

FIG. 1 is a block diagram illustrating a configuration example of an optical transmission device 501 according to a first example embodiment of the present invention. The optical transmission device 501 includes a WSS 510, a wavelength monitor (MON) 520, a temperature monitor (TEMP) 530, a control unit (CONT) 540, and an optical processing unit (PROC) 550. The WSS 510 is a wavelength selective switch, and subjects one or more beams of light input to an input port to wavelength division or wavelength multiplexing under control of the control unit 540, and outputs the light from an output port. The WSS 510 may include a plurality of input ports. The WSS 510 may also include a plurality of output ports.

The wavelength monitor 520 monitors a spectrum of output light to be output from one of the output ports of the WSS 510, and outputs a signal expressing the spectrum to the control unit 540. For example, when a WDM signal is output from the WSS 510, the wavelength monitor 520 outputs, to the control unit 540, a signal expressing a spectrum of each of carriers (optical carriers) included in the WDM signal. The temperature monitor 530 monitors a temperature inside the optical transmission device 501 in which the WSS 510 is mounted, and outputs, to the control unit 540, a signal indicating the temperature inside the optical transmission device 501. The control unit 540 controls transmission characteristics of the WSS 510, based on the signal expressing the spectrum and the signal indicating the temperature. The temperature monitor 530 converts a surrounding temperature into an electric signal. As the temperature monitor 530, it is possible to employ a resistance thermometer or a thermocouple. The optical processing unit 550 performs predetermined processing to light to be output from the optical transmission device 501. The optical processing unit 550 is an optical component such as an optical amplifier, an optical attenuator, an optical filter, or an optical modulator, but is not limited to these optical components.

Figure 2:
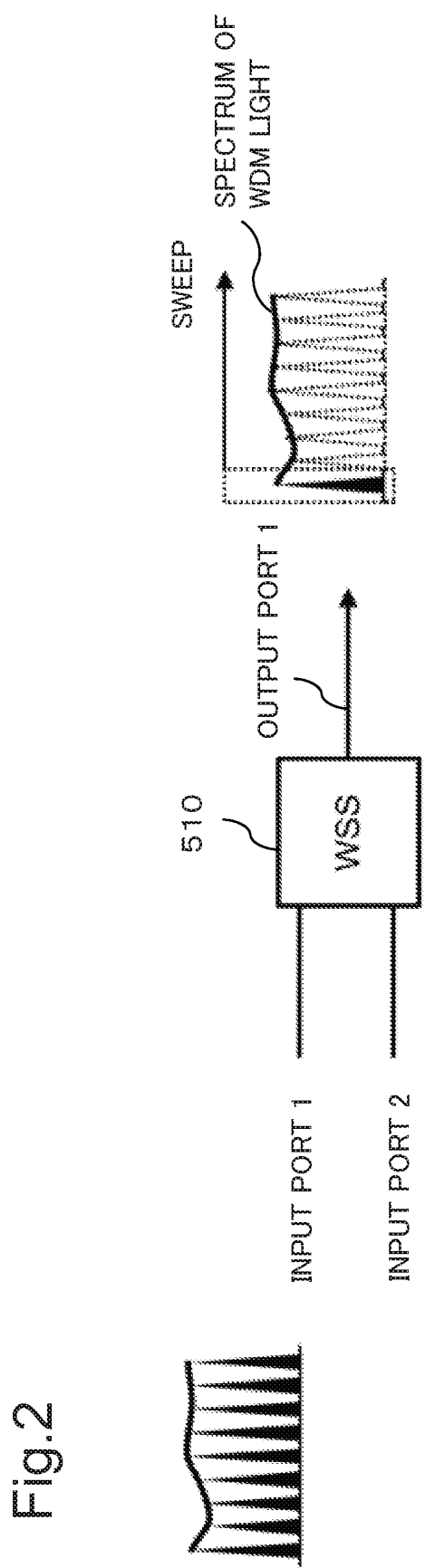
FIG. 2 is a diagram describing an example of monitoring a spectrum of output light of a WSS 510.

FIG. 2 is a diagram describing an example of monitoring a spectrum of output light of the WSS 510. The wavelength monitor 520 monitors a wavelength of light to be output from the WSS 510. When the WSS 510 outputs a WDM signal, the wavelength monitor 520 sweeps a wavelength to be monitored, and generates a signal expressing a spectrum of the WDM signal. The signal expressing the spectrum of the WDM signal includes, for example, information on a light intensity of the WDM signal for each of carriers.

Figure 3:
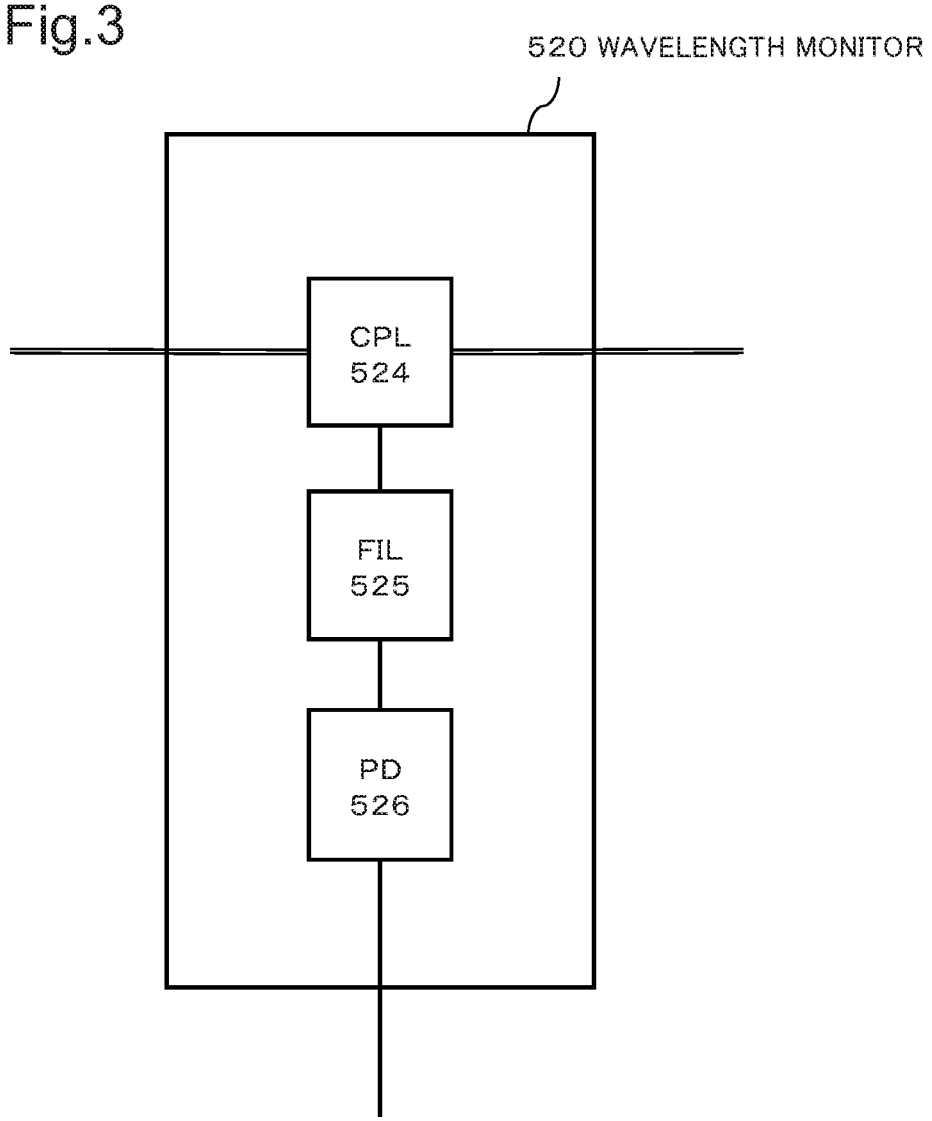
FIG. 3 is a block diagram illustrating a configuration example of a wavelength monitor 520.

FIG. 3 is a block diagram illustrating a configuration example of the wavelength monitor 520. The wavelength monitor 520 includes a coupler (CPL) 524, a filter (FIL) 525, and a photo detector (PD) 526. The coupler 524 splits a part of output light of the WSS 510, and guides one part of the split light to the filter 525. The other part of the split light is transmitted toward the optical processing unit 550. As the coupler 524, it is possible to employ an optical fiber coupler or a directional coupler employing a dielectric multilayer filter.

The filter 525 is an optical filter capable of changing a transmission wavelength. For example, causing the control unit 540 to control an incident angle of light to a diffraction grating allows only a part of wavelengths of light split by the coupler 524 to be input to the photo detector 526. The photo detector 526 is, for example, a photodiode, and outputs photocurrent associated with an intensity of input light. In this configuration, the wavelength monitor 520 sweeps a transmission wavelength of the filter 525, and outputs a signal expressing a spectrum of output light of the WSS 510.

Figure 4:
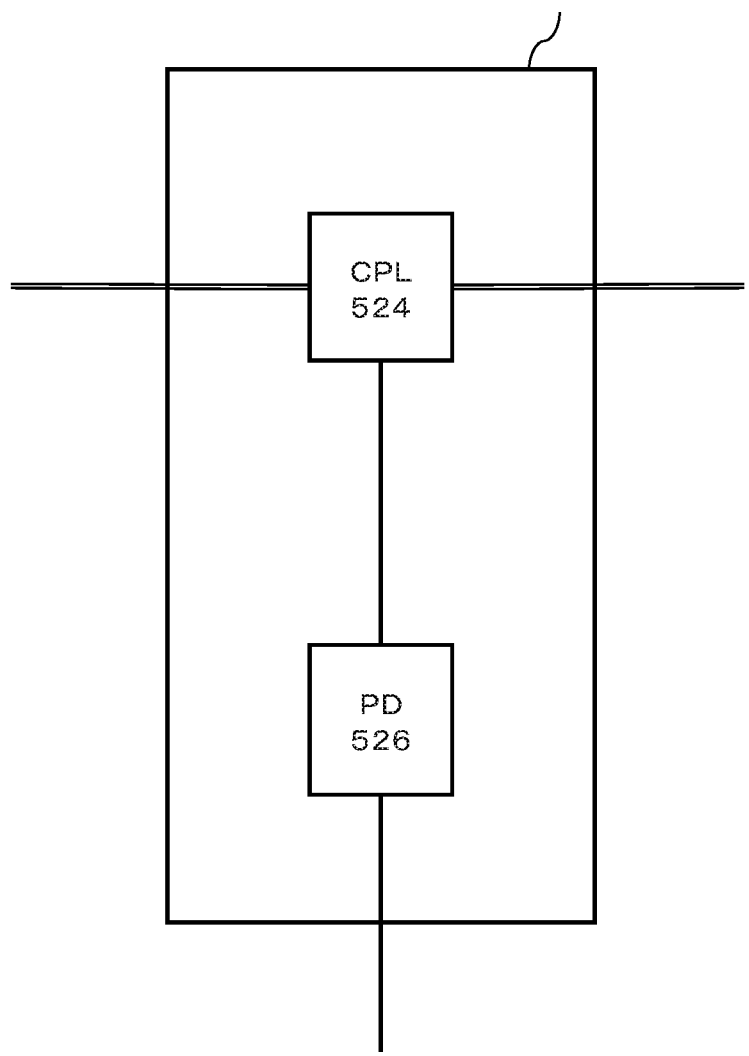
FIG. 4 is a block diagram illustrating a configuration example of a wavelength monitor 520A.

FIG. 4 is a block diagram illustrating a configuration example of the wavelength monitor 520A. In the wavelength monitor 520A, the filter 525 is omitted from the wavelength monitor 520. The control unit 540 can control the WSS 510 to output only an optical signal of a specific wavelength. In such a control, the wavelength monitor 520A is able to output photocurrent associated with an intensity of output light of the WSS 510 without the need of the filter 525. Specifically, the optical transmission device 501 may include the wavelength monitor 520A, in place of the wavelength monitor 520, and the control unit 540 may control to switch a wavelength of output light of the WSS 510 by one wavelength at a time. Also when the optical transmission device 501 has such a configuration, the control unit 540 is able to detect a spectrum of output light of the WSS 510, based on a wavelength of output light of the WSS 510 and an intensity of output light at the wavelength.

The control unit 540 controls transmission characteristics of the WSS 510, based on a signal expressing a spectrum of output light of the WSS 510 to be output from the wavelength monitor 520 or 520A, and a signal indicating a temperature to be output from the temperature monitor 530. Temperature characteristics of the optical processing unit 550 are temperature characteristics of a spectrum of output light of the optical processing unit 550, and specifically, temperature dependencies of a change in spectrum of a WDM signal in input and output with respect to the optical processing unit 550.

Temperature characteristics of the optical processing unit 550 can be measured during manufacturing of the optical transmission device 501. For example, inputting, to the optical processing unit 550, a WDM signal having a predetermined spectrum, and measuring temperature characteristics of a spectrum of a WDM signal to be output from the optical processing unit 550 enables deriving temperature characteristics of the optical processing unit 550 in association with a wavelength of a carrier included in the WDM signal. As a temperature of the optical processing unit 550, it is possible to use a temperature to be monitored by the temperature monitor 530. The measured temperature characteristics are recorded in a memory included in the control unit 540, as a temperature characteristic table.

Figure 5:
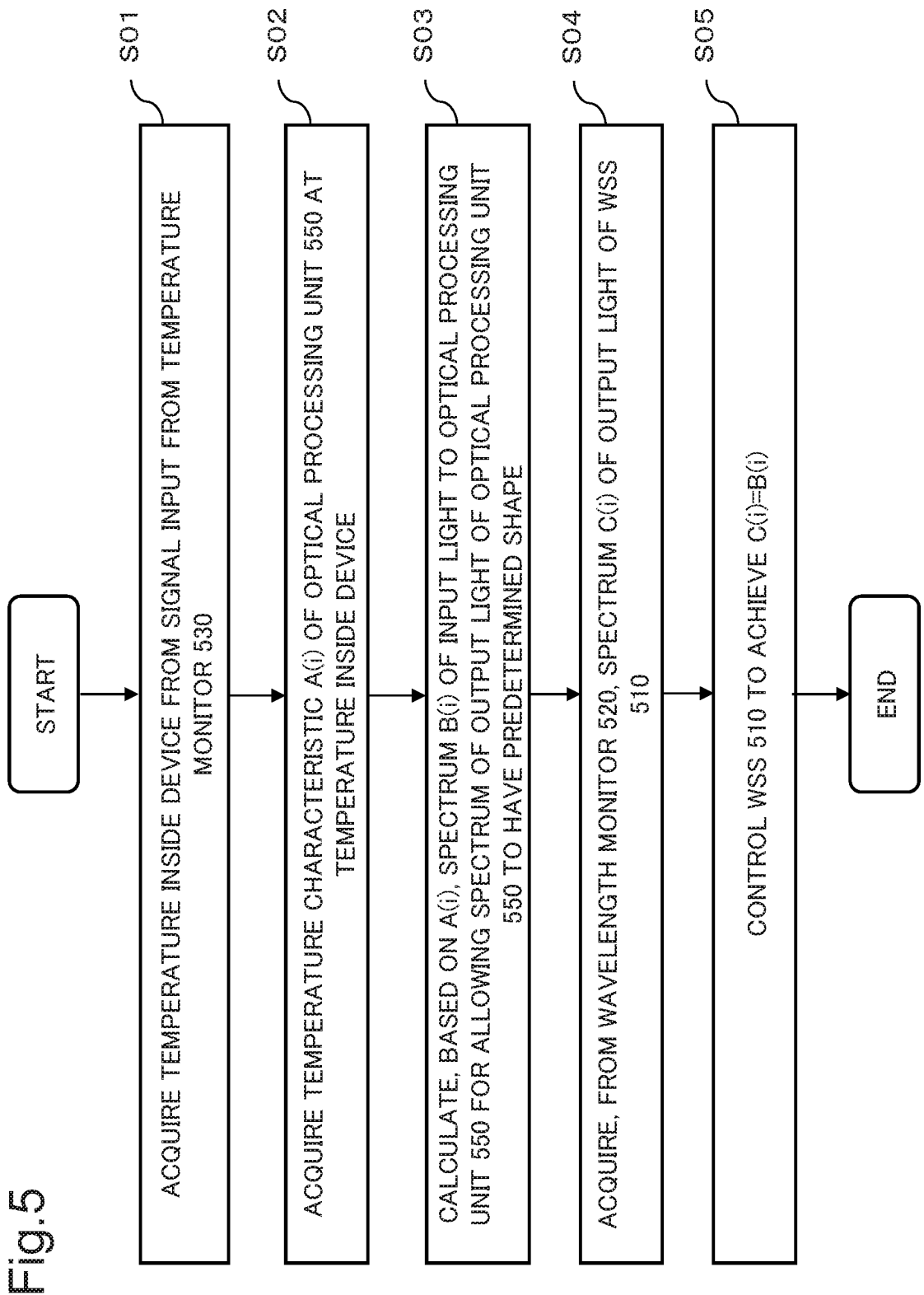
FIG. 5 is a flowchart illustrating an example of an operation procedure of a control unit 540.

FIG. 5 is a flowchart illustrating an example of an operation procedure of the control unit 540, after the optical transmission device 501 is installed on site (e.g. in a seabed). The control unit 540 acquires a temperature inside the device from a signal input from the temperature monitor 530 (Step S01 in FIG. 5). The control unit 540 acquires a temperature characteristic A(i) of the optical processing unit 550 at the temperature by referring to a temperature characteristic table (Step S02). The suffix i denotes a carrier of the i-th wavelength of a WDM signal constituted of n carriers. In Step S02, the control unit 540 acquires a part or all of the temperature characteristic A(i) of i carriers included in the WDM signal. The numbers i and n are each a natural number, and 0<i<n. Regarding a wavelength, of which the temperature characteristic A(i) is not written in the temperature characteristic table, the temperature characteristic may be derived by interpolating or extrapolating a value written in the temperature characteristic table.

The control unit 540 calculates, based on A(i), a spectrum B(i) of input light to the optical processing unit 550 for allowing a spectrum of output light of the optical processing unit 550 to have a predetermined shape (Step S03). For example, the spectrum B(i) is a spectrum in which spectral fluctuations of input and output with respect to the optical processing unit 550 at a temperature indicated on the temperature monitor 530 are cancelled. The spectrum B(i) may be derived as a reverse characteristic of the temperature characteristic A(i).

Subsequently, the control unit 540 acquires, from the wavelength monitor 520, a spectrum C(i) having a shape of a spectrum of output light (a WDM signal) of the WSS 510 (Step S04). The control unit 540 controls transmission characteristics of the WSS 510 in such a way that the spectrum C(i) of output light of the WSS 510 coincides with the spectrum B(i) derived in Step S03. Specifically, the spectrum C(i) is controlled by setting the spectrum B(i) as a target value. Consequently, a WDM signal having a spectrum capable of cancelling temperature characteristics of the optical processing unit 550 is input to the optical processing unit 550, and temperature characteristics of a spectrum of a WDM signal to be output from the optical processing unit 550 are compensated. Note that the WSS 510 does not have to be controlled in such a way that the spectra B(i) and C(i) strictly coincide with each other. There may be a difference between the spectra B(i) and C(i) in a range allowable in terms of system specifications. Control of the spectrum C(i) of the WSS 510 may be such that B(i) is set as a target value of control of the WSS 510 with respect to a wavelength for which the spectrum B(i) is derived, and a value acquired by interpolating or extrapolating B(i) is set as a target value with respect to a wavelength for which the spectrum B(i) is not derived.

In this way, the control unit 540 controls transmission characteristics of the WSS 510 in such a way that a WDM optical signal that compensates for temperature characteristics of the optical processing unit 550 is input to the optical processing unit 550. In this case, since the spectrum C(i) of output light of the WSS 510 is controlled to coincide with the spectrum B(i), fluctuations, due to temperature or aging change, of transmission characteristics of the WSS 510, which is included in the spectrum C(i), are also simultaneously compensated for.

In the foregoing description, it is assumed that an influence on a spectrum of a WDM signal by the coupler 524 included in the wavelength monitors 520 and 520A can be ignored. However, when optical characteristics and temperature characteristics of the coupler 524 are known, a value of the spectrum B(i) may be corrected in such a way as to compensate for the influence. Thus, it is possible to bring a spectrum of input light to the optical processing unit 550 closer to B(i).

FIG. 6 is an example of a temperature characteristic table of the optical processing unit 550. The temperature characteristic table records temperature characteristics of the optical processing unit 550 at a plurality of temperatures in association with wavelengths λ1 to λ3. λ1 to λ3 are wavelengths selected from among wavelengths included in a WDM signal to be input to the optical processing unit 550, but the wavelengths are not limited to the three wavelengths. The temperature characteristic A(i) is a fluctuation amount of a spectrum of a WDM signal to be output from the optical processing unit 550 with respect to a temperature. For example, with reference to FIG. 6, an intensity of a carrier of the wavelength λ1 to be output from the optical processing unit 550 at 0° C. is increased by 0.5 dB, as compared with a case of 20° C. In this case, controlling transmission characteristics of the WSS 510 to lower the power of the carrier of the wavelength λ1 to be input to the optical processing unit 550 by 0.5 dB enables compensating for temperature characteristics of the wavelength λ1. Specifically, at 0° C. and at the wavelength λ1, B(i)=−A(i)=−0.5 dB. Similarly controlling transmission characteristics of the WSS 510 with respect to the other wavelengths enables compensating for temperature characteristics of the optical processing unit 550 with respect to a WDM signal. Numerical values in FIG. 6 are examples, and do not limit the example embodiment.

A value of B(i) may be written in advance in a temperature characteristic table, and the control unit 540 may directly read B(i) from the temperature characteristic table, in place of performing Steps S02 and S03 in FIG. 5. A target spectrum of output light of the optical processing unit 550 does not have to be flat. A spectrum of output light of the optical processing unit 550 may have a predetermined shape, which is determined by a request of a system in which the optical transmission device 501 is employed. A value of the temperature characteristic A(i) may be written in such a way that such a predetermined spectrum is achieved.

As described above, the optical transmission device 501 according to the first example embodiment provides an advantageous effect that it is possible to compensate for characteristics of a spectrum of each of the WSS 510 and the optical processing unit 550, and set a spectrum of output light of the optical transmission device 501 to a desired state.

Second Example Embodiment

Figure 7:
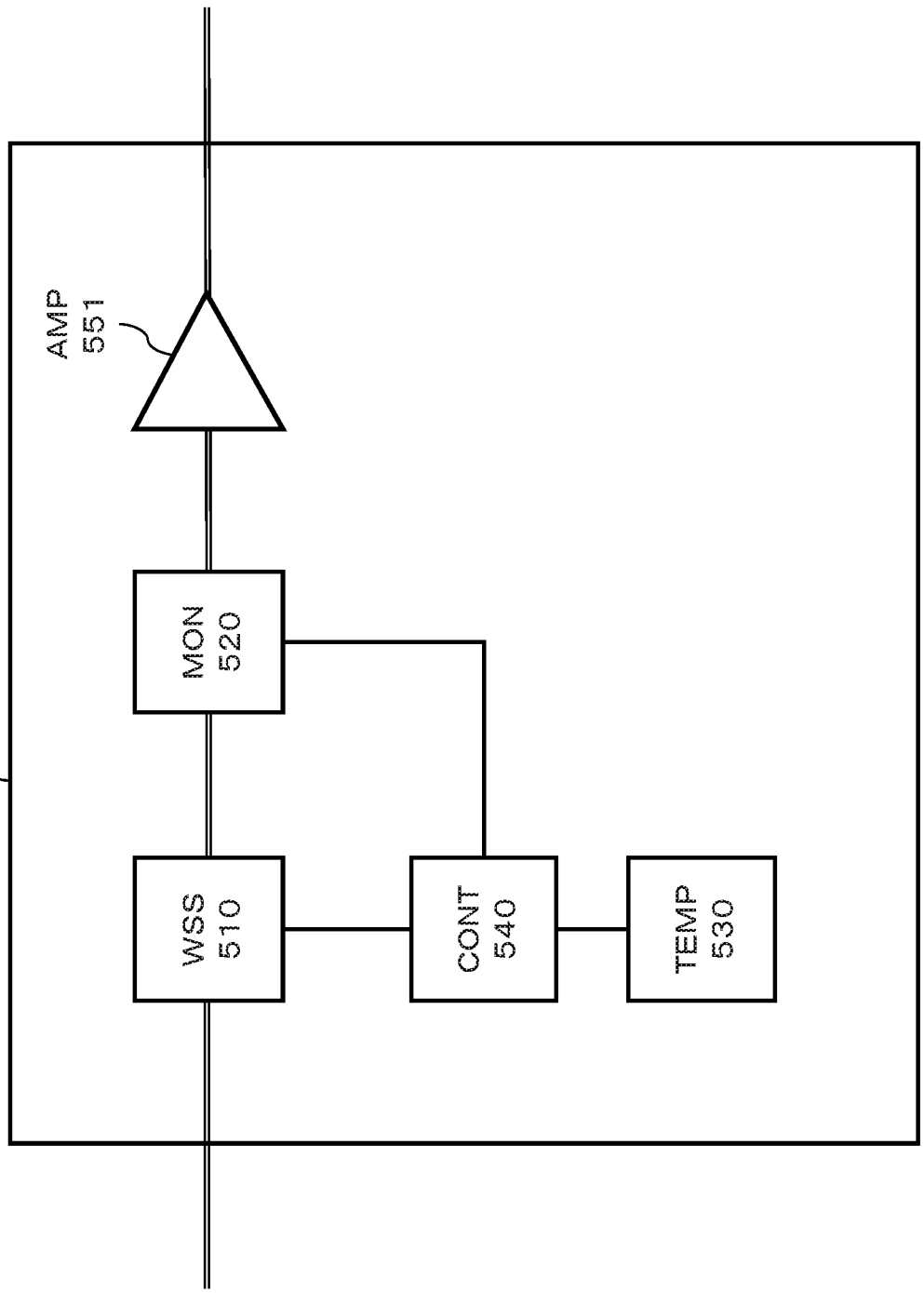
FIG. 7 is a block diagram illustrating a configuration example of an optical transmission device 502 according to a second example embodiment.

FIG. 7 is a block diagram illustrating a configuration example of an optical transmission device 502 according to a second example embodiment of the present invention. The optical transmission device 502 is different from the optical transmission device 501 according to the first example embodiment in a point that an optical amplifier (AMP) 551 is included as an example of an optical processing unit 550. The optical amplifier 551 is, for example, an optical fiber amplifier; and amplifies light output from a wavelength monitor 520, and outputs the amplified light to the outside of the optical transmission device 501. It is known that an output spectrum of an optical amplifier fluctuates depending on a temperature. In the present example embodiment, by measuring in advance temperature characteristics of a spectrum of output light of the optical amplifier 551 and recording the measured temperature characteristics in a temperature characteristic table, a control unit 540 is able to control a WSS 510 in such a way as to compensate for transmission characteristics of the WSS 510 and temperature characteristics of a spectrum of the optical amplifier 551. Therefore, the optical transmission device 502 provides an advantageous effect that it is possible to compensate for wavelength characteristics of a spectrum of each of the WSS 510 and the optical amplifier 551, and set a spectrum of output light of the optical transmission device 502 to a desired state.

Third Example Embodiment

Figure 8:
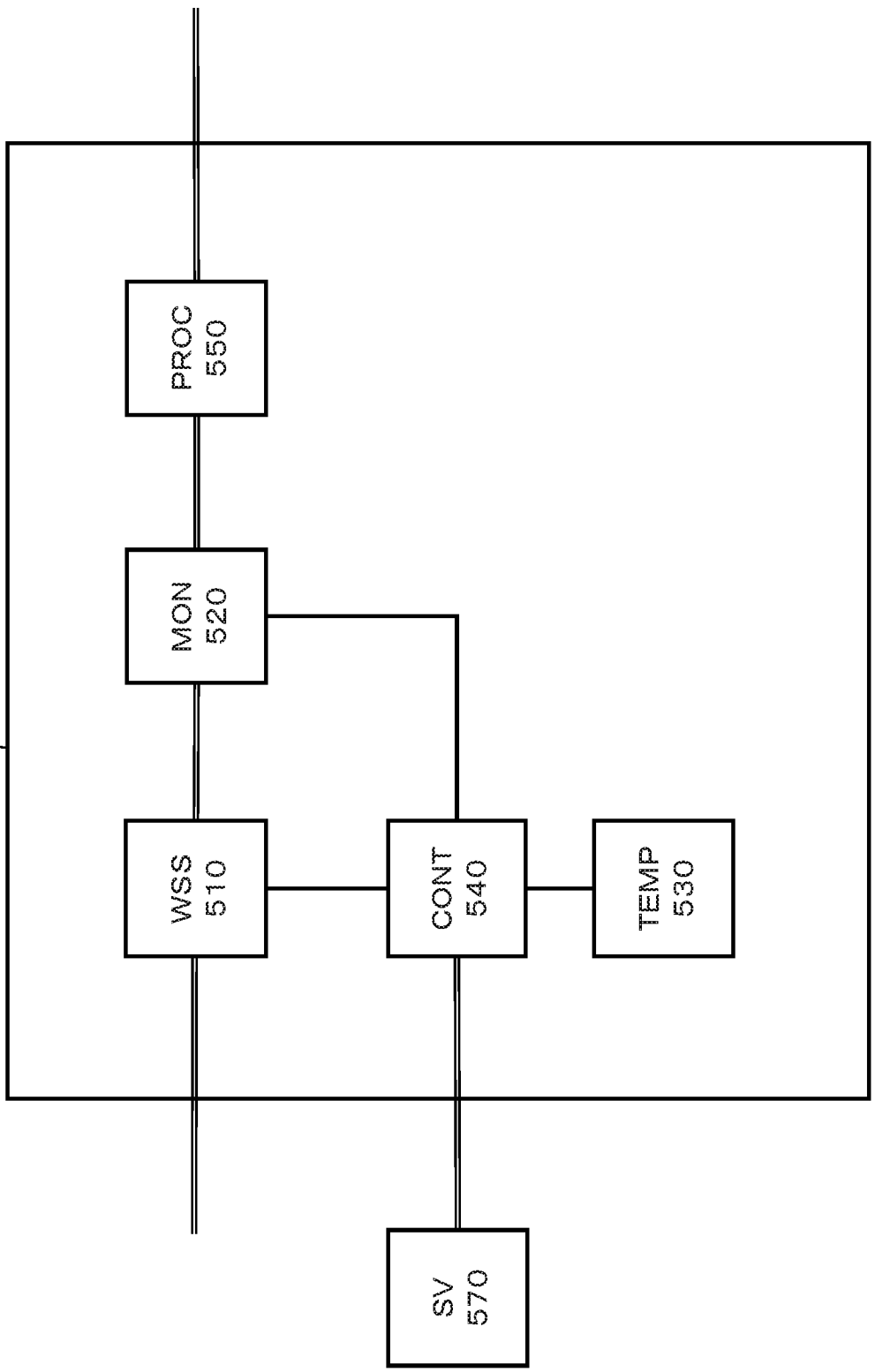
FIG. 8 is a block diagram illustrating a configuration example of an optical transmission device 503 according to a third example embodiment.

FIG. 8 is a block diagram illustrating a configuration example of an optical transmission device 503 according to a third example embodiment of the present invention. In the optical transmission device 503, a control unit 540 transmits and receives monitoring control light to and from a monitoring device (SV) 570 outside of the optical transmission device 503. The monitoring device 570 may be installed at a place away from the optical transmission device 503.

In the present example embodiment, the control unit 540 transmits, to the monitoring device 570, a signal indicating a temperature of the optical transmission device 503 in a state that the signal is included in data of monitoring control light. The monitoring device 570 includes a temperature characteristic table in which temperature characteristics of a spectrum of an optical processing unit 550 are recorded; derives a spectrum B(i) according to a procedure similar to the first example embodiment, and notifies the control unit 540 of the spectrum B(i). The control unit 540 sets transmission characteristics of a WSS 510 according to a procedure of Steps S04 and S05 in FIG. 5. A procedure to be performed by the monitoring device 570 is equivalent to Steps S02 and S03 in FIG. 5. The monitoring device 570 may also perform the procedure of Steps S04 and S05 in FIG. 5, and notify the control unit 540 of a signal for controlling the WSS 510.

The optical transmission device 503 having such a configuration provides an advantageous effect that it is possible to compensate for wavelength characteristics of a spectrum of each of the WSS 510 and the optical processing unit 550, and set a spectrum of output light of the optical transmission device 503 to a desired state. Since the optical transmission device 503 includes a temperature characteristic table in the monitoring device 570, it is possible to reduce a size of the control unit 540. Communication between the control unit 540 and the monitoring device 570 may be performed not by an optical signal but by an electric signal.

Fourth Example Embodiment

Figure 9:
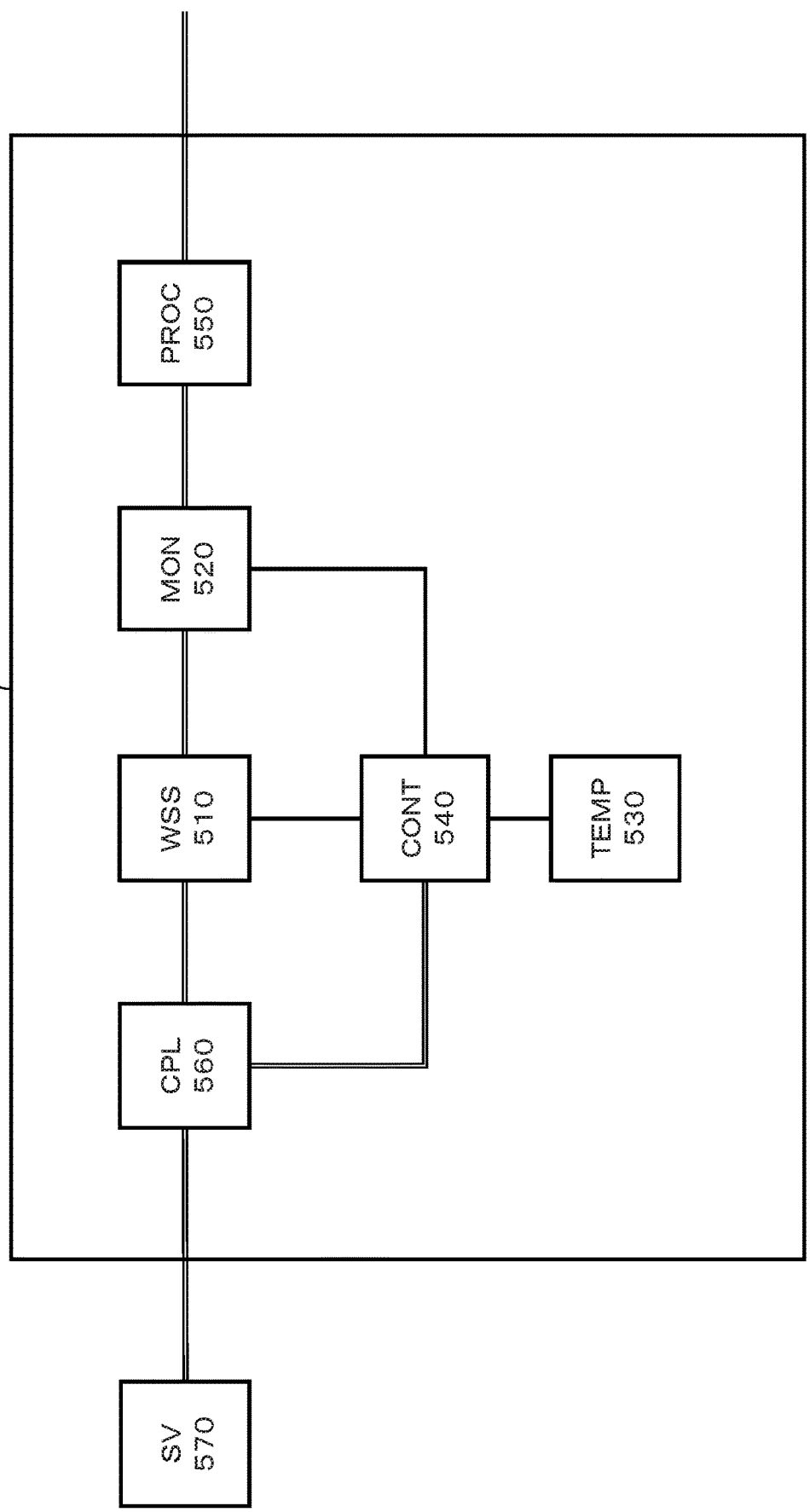
FIG. 9 is a block diagram illustrating a configuration example of an optical transmission device 504 according to a fourth example embodiment.

FIG. 9 is a block diagram illustrating a configuration example of an optical transmission device 504 according to a fourth example embodiment of the present invention. The optical transmission device 504 is different from the optical transmission device 503 according to the third example embodiment in a point that a coupler (CPL) 560 is included. The coupler 560 is, for example, an optical multiplexer/demultiplexer for subjecting an optical signal to wavelength division multiplexing. A wavelength of monitoring control light is different from a wavelength of a main signal passing through a WSS 510. A control unit 540 transmits and receives monitoring control light to and from a monitoring device (SV) 570 outside of the optical transmission device 504 via the coupler 560. Communication between the optical transmission device 504 and the monitoring device 570 for deriving a spectrum B(i) may be performed by using a monitoring control channel, which is generally included in the optical transmission device 504. In FIG. 9, a transmission device of a main signal, which is collocated with the monitoring device 570, is omitted.

The control unit 540 according to the present example embodiment transmits a signal indicating a temperature of the optical transmission device 504 input from a temperature monitor 530 in a state that the signal is included in data of monitoring control light. The control unit 540 receives the spectrum B(i) from the monitoring device 570, and controls transmission characteristics of the WSS 510 in such a way that a spectrum C(i) of output light of the WSS 510 coincides with the spectrum B(i). The optical transmission device 504 having such a configuration also provides an advantageous effect that it is possible to compensate for wavelength characteristics of a spectrum of each of the WSS 510 and an optical processing unit 550, and set a spectrum of output light of the optical transmission device 504 to a desired state. As compared with the optical transmission device 503 according to the third example embodiment, in the optical transmission device 504, it is not necessary to prepare a physical line for controlling the WSS 510 with respect to the monitoring device 570.

Fifth Example Embodiment

Figure 10:
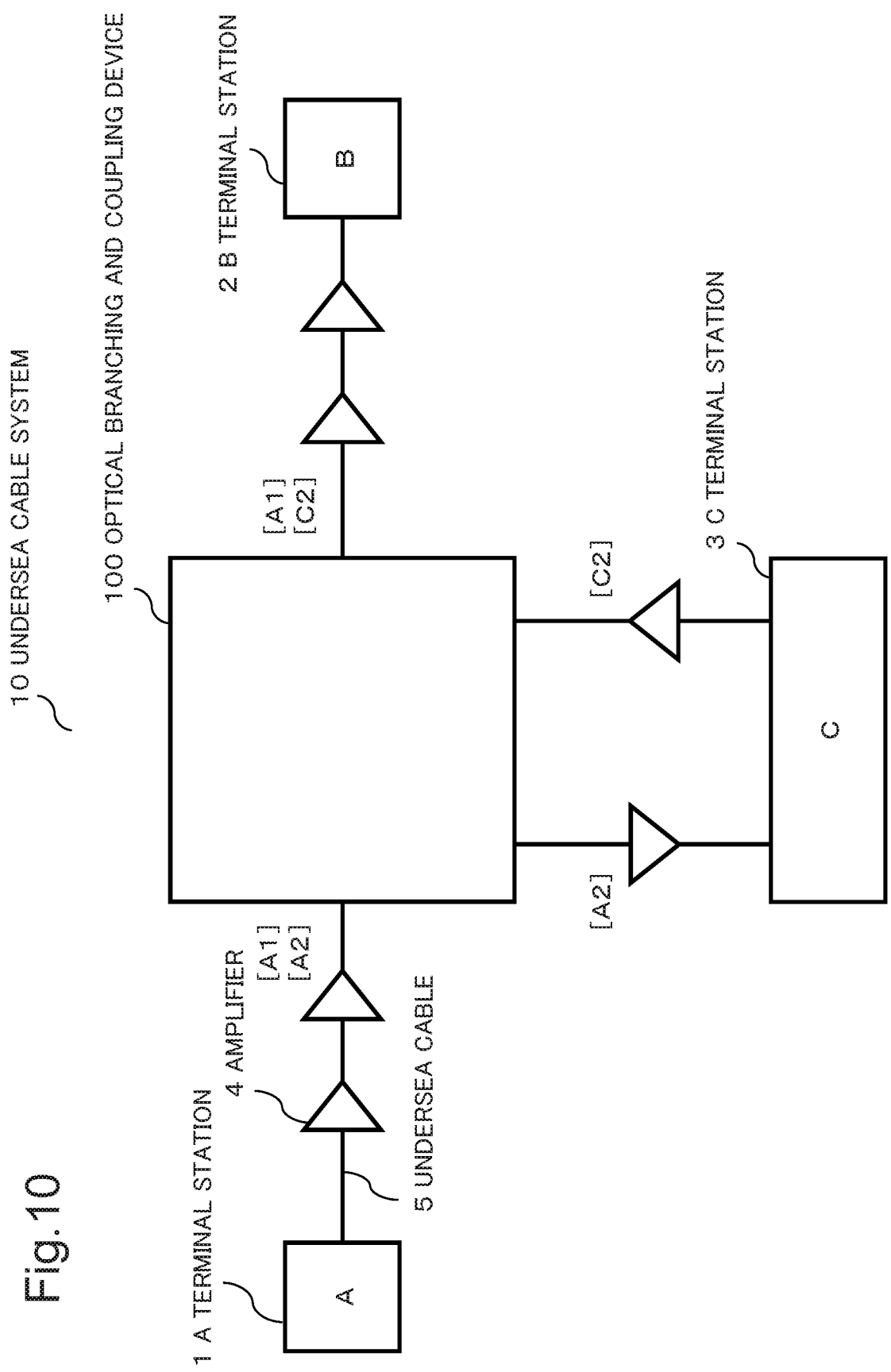
FIG. 10 is a block diagram illustrating a configuration example of an undersea cable system 10 according to a fifth example embodiment.

FIG. 10 is a block diagram illustrating a configuration example of an undersea cable system 10 according to a fifth example embodiment of the present invention. The undersea cable system 10 includes an A terminal station 1, a B terminal station 2, a C terminal station 3, and an optical branching and coupling device 100. When the A terminal station 1, the B terminal station 2, and the C terminal station 3 are generically referred to, the terminal stations are written as the terminal stations 1 to 3.

Each of the terminal stations 1 to 3 is a terminal station installed on the land, and is an interface between a signal to be transmitted through an undersea cable 5, and a network on the land. The terminal stations 1 to 3 are connected to the optical branching and coupling device 100 via the undersea cable 5. The undersea cable 5 may include an optical fiber for transmitting an optical signal, and may be provided with one or more amplifiers 4 at a midway thereof. The amplifier 4 is, for example, an optical fiber amplifier in which an amplification medium doped with erbium is employed. The optical branching and coupling device 100 is a node having a ROADM function, and also referred to as a ROADM branching and coupling device or a ROADM node. The optical branching and coupling device 100 is installed in a seabed, and switches an output destination of an optical signal in a wavelength unit by splitting and coupling an input optical signal in a wavelength unit.

In the present example embodiment, the A terminal station 1 transmits, to the optical branching and coupling device 100, a WDM signal including optical signals of wavelength bands A1 and A2. The optical signal of the wavelength band A1 is an optical signal in which the B terminal station 2 is a destination, and the optical signal of the wavelength band A2 is an optical signal in which the C terminal station 3 is a destination. The C terminal station 3 receives, from the optical branching and coupling device 100, the optical signal of the wavelength band A2 transmitted from the A terminal station 1. The C terminal station 3 transmits, to the optical branching and coupling device 100, an optical signal of a wavelength band C2 in which the B terminal station 2 is a destination. The B terminal station 2 receives, from the optical branching and coupling device 100, a WDM signal acquired by multiplexing the optical signal of the wavelength band A1 transmitted from the A terminal station 1, and the optical signal of the wavelength band C2 transmitted from the C terminal station 3.

The optical branching and coupling device 100 receives the WDM signal of the wavelength bands A1 and A2 from the A terminal station 1, and receives the optical signal of the wavelength band C2 from the C terminal station 3. The optical branching and coupling device 100 generates, from these optical signals, a WDM signal including optical signals of the wavelength bands A1 and C2, transmits the WDM signal to the B terminal station 2, and transmits, to the C terminal station 3, the optical signal of the wavelength band A2, which is separated from the WDM signal received from the A terminal station 1.

The wavelength band A1 and the wavelength band A2 do not overlap each other. The wavelength band A1 and the wavelength band C2 also do not overlap each other. In the following description, the WDM signal including the optical signals of the wavelength bands A1 and A2 to be transmitted from the A terminal station 1 is written as a "WDM signal ([A1][A2])". The WDM signal including the optical signal of the wavelength band A1 to be transmitted from the A terminal station 1, and the optical signal of the wavelength band C2 to be transmitted from the C terminal station 3 is written as a "WDM signal ([A1][C2])". The optical signal of the wavelength band A2 to be transmitted from the A terminal station 1, which is separated from the WDM signal ([A1][A2]), is written as an "optical signal ([A2])". Likewise, the optical signal of the wavelength band C2 to be transmitted from the C terminal station 3 is written as an "optical signal ([C2])". In each of the block diagrams, an optical signal is simply written as [A1], [A2], or [C2].

Subsequently, details on a configuration and an operation of the optical branching and coupling device 100 are described.

Figure 11:
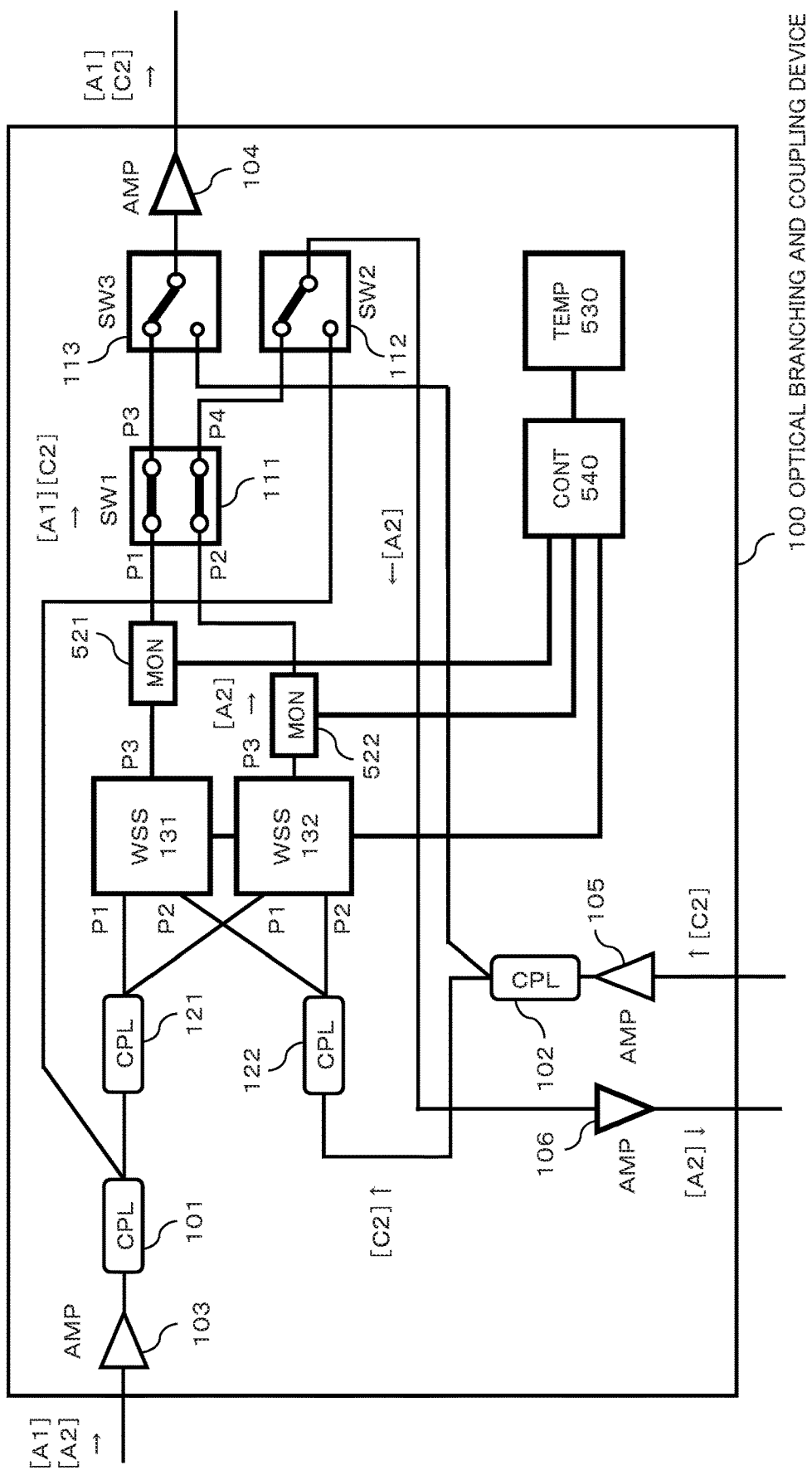
FIG. 11 is a block diagram illustrating a configuration example of an optical branching and coupling device 100 according to the fifth example embodiment.

FIG. 11 is a block diagram illustrating a configuration example of the optical branching and coupling device 100. The optical branching and coupling device 100 includes couplers (CPL) 101 to 102, and 121 to 122, optical amplifiers (AMP) 103 to 106, switches (SW1 to SW3) 111 to 113, and WSSs 131 to 132.

The optical branching and coupling device 100 further includes wavelength monitors 521 to 522, and a temperature monitor 530. A space between the optical components included in the optical branching and coupling device 100 is connected by an optical circuit using an optical fiber, an optical waveguide, an optical space propagation, and the like.

In the present example embodiment, the WSSs 131 and 132 each have a function similar to the WSS 510 described in the first example embodiment. The wavelength monitors 521 and 522 each have a function similar to the wavelength monitor 520 or 520A described in the first example embodiment. The temperature monitor 530 and a control unit 540 also have functions similar to those of the first example embodiment. Constituent elements (e.g. the switches 111 to 113, and the optical amplifiers 104 and 106) connected to a later stage of the wavelength monitors 521 and 522 are associated with the optical processing unit 550 according to the first example embodiment.

The couplers 101 to 102, and 121 to 122 are each a 1×2 optical coupler; and splits an input optical signal into two parts, and outputs the signal. A splitting ratio of each of the couplers is, for example, 1:1, but is not limited to this. As the couplers 101 to 102 and 121 to 122, it is possible to employ a fused-fiber coupler or an optical waveguide coupler. Specifically, the optical branching and coupling device 100 includes the constituent elements of the optical transmission device 501 according to the first example embodiment.

The optical amplifiers 103 to 106 are optical amplifiers provided inside the optical branching and coupling device 100, as necessary. As the optical amplifiers 103 to 106, it is possible to employ an optical fiber amplifier or a semiconductor optical amplifier. The optical amplifiers 103 to 106 compensate for an optical level inside the optical branching and coupling device 100. When the optical amplifiers 103 to 106 are optical fiber amplifiers, the optical amplifiers 103 to 106 may generate a response signal that notifies either of the terminal stations 1 to 3 of a state of the optical branching and coupling device 100 by imparting modulation to drive current of an excited laser diode (LD).

The switch 111 is a 2×2 optical switch including input ports P1 and P2 and output ports P3 and P4, and the switches 112 and 113 are each a 1×2 optical switch. As the switches 111 to 113, it is possible to employ an optical waveguide switch, a mechanical switch, and a micro electro mechanical systems (MEMS) switch.

The WSSs 131 and 132 are each a wavelength selective switch including input ports P1 and P2, and an output port P3. Each of the WSSs 131 and 132 separates and couples optical signals input from P1 and P2 thereof in a wavelength unit, and outputs the optical signal from P3 thereof. Connection between input and output ports inside the WSSs 131 and 132, and wavelength bands of optical signals to be output from the WSSs 131 and 132 may be controlled from the outside (e.g. either of the terminal stations 1 to 3) of the WSSs 131 and 132. Alternatively, the control unit 540 may perform the control. The control unit 540 may control connection of input and output of the switches 111 to 113. The control unit 540 may have a function of monitoring operation states of the WSSs 131 and 132, and may control the switches 111 to 113, based on the operation states of the WSSs 131 and 132.

In the present example embodiment, the control unit 540 controls transmission characteristics of the WSS 131, based on a signal expressing a spectrum of output light of the WSS 131, and a signal indicating a temperature of the optical branching and coupling device 100. The control unit 540 controls transmission characteristics of the WSS 132, based on a signal expressing a spectrum of output light of the WSS 132, and a signal indicating a temperature of the optical branching and coupling device 100.

The control unit 540 includes a temperature characteristic table illustrating temperature characteristics of a spectrum of an optical component on an optical path from the wavelength monitor 521 to an output of the optical branching and coupling device 100. The control unit 540 includes a temperature characteristic table illustrating temperature characteristics of a spectrum of an optical component on an optical path from the wavelength monitor 522 to the output of the optical branching and coupling device 100. Since the optical paths from the wavelength monitors 521 and 522 to the output of the optical branching and coupling device 100 differ depending on states of the switches 111 to 113, the control unit 540 may include a temperature characteristic table for each of conceivable optical paths.

(5-1. Case that Setting of Transmission Characteristics is not being Performed for WSSs 131 and 132)

With reference to FIG. 11, when a procedure of setting transmission characteristics is not being performed for the WSSs 131 and 132, a WDM signal ([A1][A2]) transmitted from the A terminal station 1 is input to the optical branching and coupling device 100. The WDM signal ([A1][A2]) input to the optical branching and coupling device 100 passes through the optical amplifier 103, and the couplers 101 and 121, and is input to P1 of each of the WSSs 131 and 132. An optical signal ([C2]) transmitted from the C terminal station 3 passes through the optical amplifier 105, and the couplers 102 and 122, and is input to P2 of each of the WSSs 131 and 132.

The WDM signal ([A1][A2]) is input from the coupler 121 to P1 of the WSS 131. The optical signal ([C2]) is input from the coupler 122 to P2 of the WSS 131. The WSS 131 separates an optical signal ([M]) from the WDM signal ([A1][A2]) input to P1, couples the separated optical signal ([M]) and the optical signal ([C2]) input to P2, and generates a WDM signal ([A1][C2]). The generated WDM signal ([A1] [C2]) passes through the wavelength monitor 521 from P3 of the WSS 131, and is output to P1 of the switch 111. The WSS 132 separates an optical signal ([A2]) from the WDM signal ([A1][A2]) input to P1, allows the optical signal ([A2]) to pass through the wavelength monitor 522 from P3 of the WSS 132, and outputs the optical signal ([A2]) to P2 of the switch 111.

In FIG. 11, the switch 111 is controlled in such a way that P1 and P3 thereof are connected to each other, and P2 and P4 thereof are connected to each other. The WDM signal ([A1][C2]) passes through the switch 111, the switch 113, and the optical amplifier 104, and is transmitted to the outside (toward the B terminal station 2). The optical signal ([A2]) passes through the switch 111, the switch 112, and the optical amplifier 106, and is transmitted to the outside (toward the C terminal station 3).

In this way, the optical signal ([A1]) included in the WDM signal ([A1][A2]) transmitted from the A terminal station 1, and the optical signal ([C2]) transmitted from the C terminal station 3 are transmitted to the B terminal station 2 being a destination of each of the optical signals. The optical signal ([A2]) included in the WDM signal ([A1][A2]) is transmitted to the C terminal station 3 being a destination thereof.

Each of the wavelength monitors 521 and 522 outputs, to the control unit 540, a signal expressing a spectrum of a WDM signal to be output from each of the WSSs 131 and 132. The control unit 540 includes a temperature characteristic table of each of the optical components connected to a later stage of the wavelength monitors 521 and 522, and controls transmission characteristics of the WSSs 131 and 132 according to a procedure similar to that of the first example embodiment.

In FIG. 11, the control unit 540 refers to each of temperature characteristic tables of an optical path from P1 of the switch 111 through the switch 113 to the optical amplifier 104, and an optical path from P2 of the switch 111 through the switch 112 to the optical amplifier 106. Then, the control unit 540 acquires a temperature characteristic A(i) associated with a temperature acquired from the temperature monitor 530 regarding each of the paths, and derives a target spectrum B(i).

The control unit 540 further acquires, from the wavelength monitors 521 and 522, a spectrum C(i) of each of output light of the WSSs 131 and 132. Then, the control unit 540 controls transmission characteristics of the WSSs 131 and 132 in such a way that the spectrum C(i) of each of the output light coincides with the spectrum B(i).

(5-2. Case that Transmission Characteristics are Set for WSS 131)

As described above, the control unit 540 sets transmission characteristics for the WSSs 131 and 132. However, there is a possibility that transient transmission characteristic fluctuations may occur in a WSS during performing a setting procedure of setting transmission characteristics for the WSS. Such transient characteristic fluctuations may cause an error in a signal. In the following, setting an optical path for bypassing a WSS, for which transmission characteristics are to be set, is described in order to avoid an influence of transient characteristic fluctuations.

Figure 12:
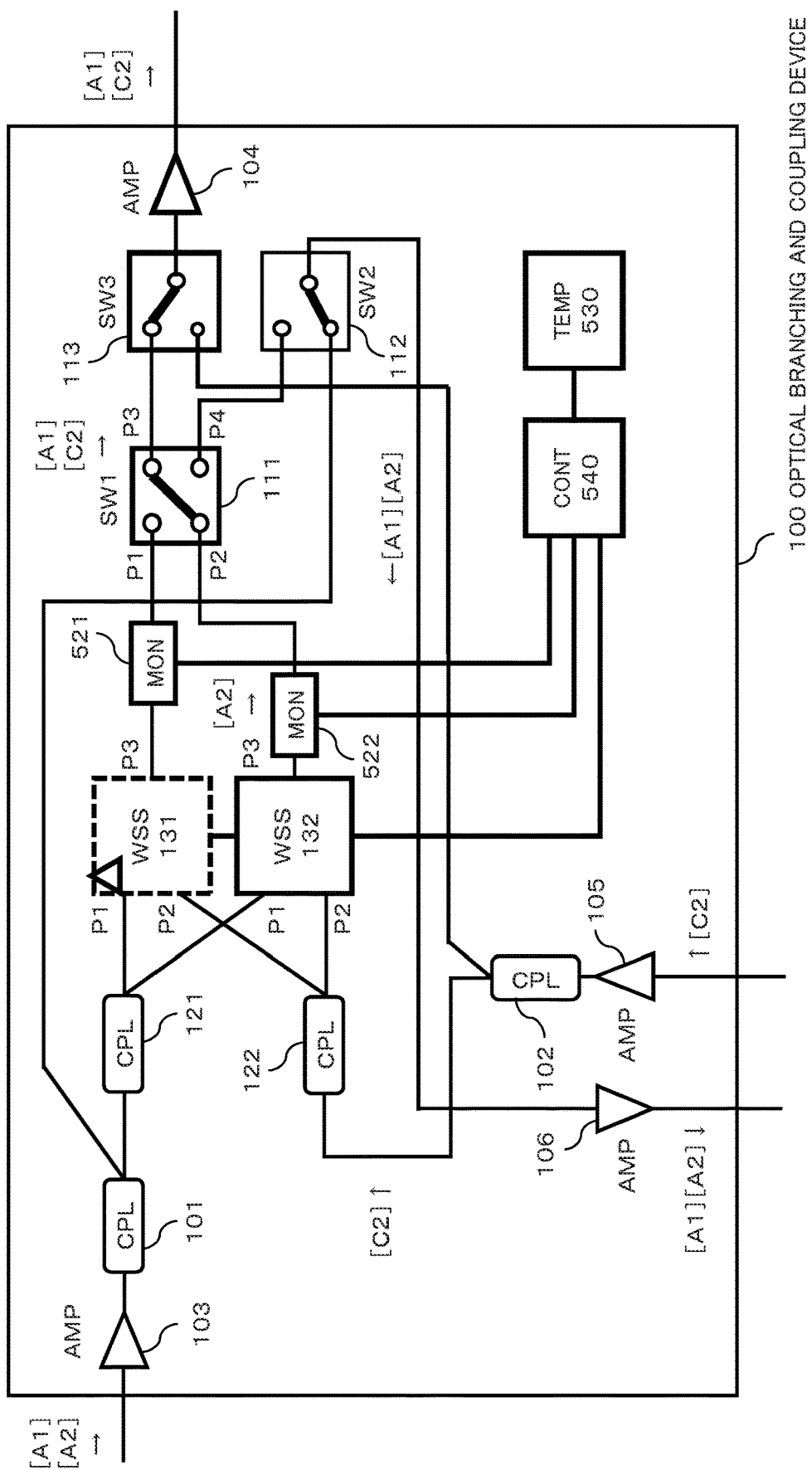
FIG. 12 is a diagram describing an optical path for diverting a main signal to a WSS 132.

FIG. 12 is a diagram describing an optical path for diverting a main signal in advance to the WSS 132, when transmission characteristics are to be set for the WSS 131. A mark "A (triangle)" appended to the WSS 131 indicates that a procedure of setting transmission characteristics for the WSS 131 is being performed. With reference to FIG. 12, a WDM signal ([A1][A2]) transmitted from the A terminal station 1 is input to the optical branching and coupling device 100, passes through the optical amplifier 103, and the couplers 101 and 121, and is input to P1 of the WSSs 131 and 132. An optical signal ([C2]) transmitted from the C terminal station 3 passes through the optical amplifier 105, and the couplers 102 and 122, and is input to P2 of the WSSs 131 and 132. When a procedure of setting transmission characteristics is performed for the WSS 131, the WSS 132 and the switches 111 to 113 are set in such a way as to achieve the following operation.

The WDM signal ([A1][A2]) is input from the coupler 121 to P1 of the WSS 132. The optical signal ([C2]) is input from the coupler 122 to P2 of the WSS 132. The WSS 132 couples an optical signal ([A1]) separated from the WDM signal ([A1][A2]) input to P1, and the optical signal ([C2]) input to P2, and generates a WDM signal ([A1] [C2]). The generated WDM signal ([A1] [C2]) passes through the wavelength monitor 522 from P3 of the WSS 132, and is output to P2 of the switch 111. In FIG. 12, the switch 111 is controlled in such a way as to connect P2 and P3 thereof to each other. Consequently, the WDM signal ([A1][C2]) passes through the switch 111, the switch 113, and the optical amplifier 104, and is transmitted to the outside (B terminal station 2).

On the other hand, in FIG. 12, the switch 112 is switched in such a way that the WDM signal ([A1][A2]) split from the coupler 101 passes through the switch 112. Consequently, the WDM signal ([A1][A2]) passes through the switch 112 and the optical amplifier 106, and is transmitted to the outside (C terminal station 3). In this case, when receiving the WDM signal ([A1] [C2]), the C terminal station 3 separates and uses only an optical signal ([A2]) in which the C terminal station 3 is a destination. The C terminal station 3 is able to separate only the optical signal ([A2]) from the WDM signal ([A1][A2]) by using a bandpass filter that transmits only the optical signal ([A2]).

In this way, the optical signal ([M]) and the optical signal ([C2]) are transmitted to the B terminal station 2 being a destination of both of the optical signals. The optical signal ([A2]) is included in the WDM signal ([A1][A2]), and transmitted to the C terminal station 3.

In this way, when a procedure of setting transmission characteristics is performed for the WSS 131, the optical branching and coupling device 100 is able to transmit a predetermined WDM signal to the B terminal station 2 and the C terminal station 3 without using the WSS 131. Since an optical signal to be output from the WSS 131 is blocked by the switch 111, the optical signal does not affect an optical signal to be output from the optical branching and coupling device 100. Consequently, even when transient transmission characteristic fluctuations occur in the WSS 131 at the time of setting transmission characteristics for the WSS 131, it is possible to suppress the fluctuations from affecting a WDM signal.

(5-3. Case that Transmission Characteristics are Set for WSS 132)

Figure 13:
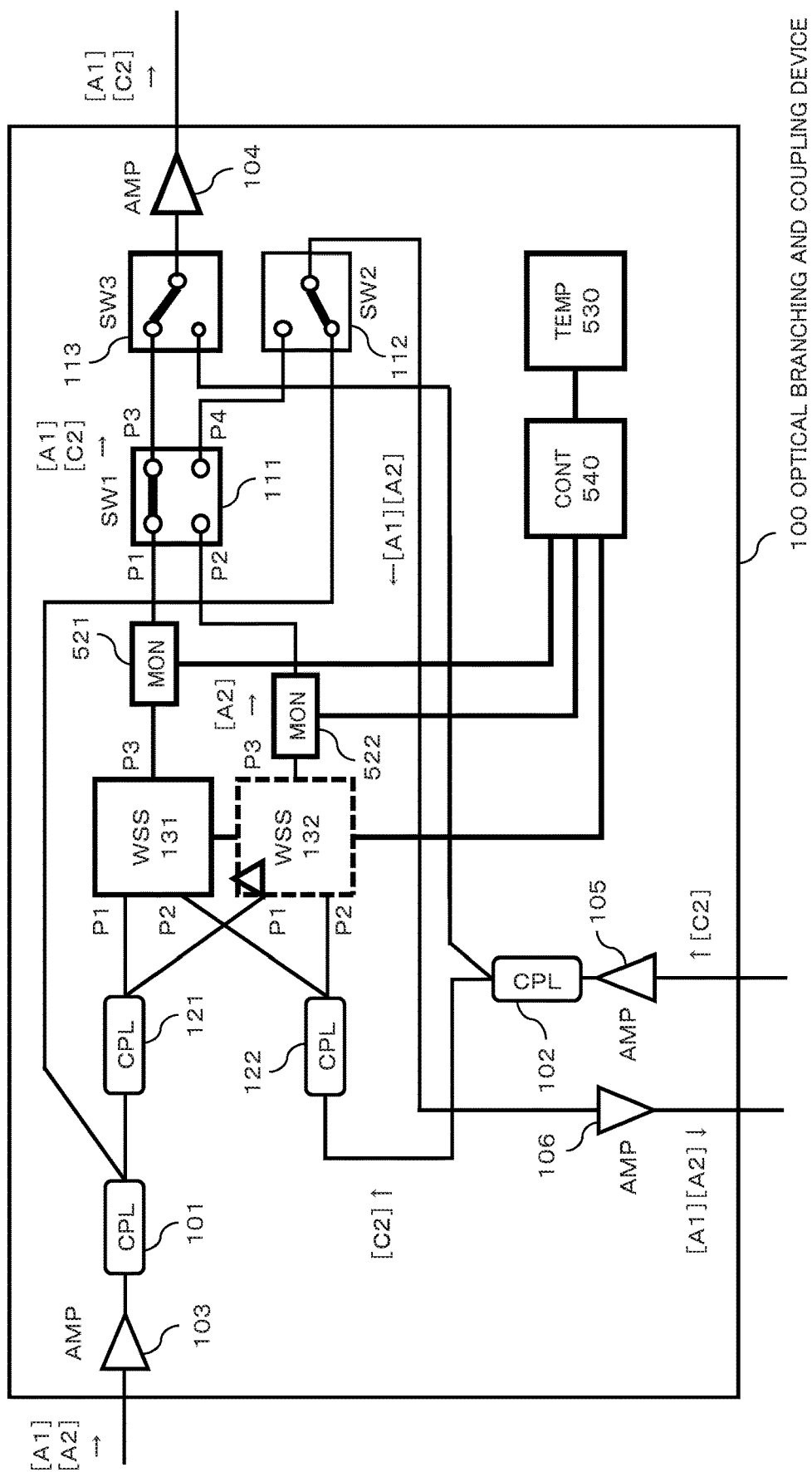
FIG. 13 is a diagram describing a case that diverts a main signal to a WSS 131.

FIG. 13 is a diagram illustrating a case that a main signal is diverted to the WSS 131, when transmission characteristics are to be set for the WSS 132. A mark "A (triangle)" appended to the WSS 132 indicates that a procedure of setting transmission characteristics for the WSS 132 is being performed.

FIG. 13 is different from FIG. 11 in a point that the switch 111 is switched in such a way that P1 and P3 are connected to each other inside the switch 111. Specifically, in FIG. 13, a WDM signal ([A1] [C2]) to be output from the output port P3 of the WSS 131 passes through the switches 111 and 113, and the optical amplifier 104, and is output to the outside (B terminal station 2) of the optical branching and coupling device 100.

On the other hand, similarly to FIG. 12, in FIG. 13, the switch 112 is switched in such a way that a WDM signal ([A1][A2]) split from the coupler 101 passes through the switch 112. Consequently, the WDM signal ([A1][A2]) passes through the switch 112 and the optical amplifier 106, and is transmitted to the outside (C terminal station 3).

In this way, similarly to FIG. 12, also in the case of FIG. 13, an optical signal ([A1]) and an optical signal ([C2]) are transmitted to the B terminal station 2 being a destination of both of the optical signals. An optical signal ([A2]) is included in the WDM signal ([A1][A2]), and transmitted to the C terminal station 3. When a procedure of setting transmission characteristics is performed for the WSS 132, the optical branching and coupling device 100 is able to transmit a WDM signal to the B terminal station 2 and the C terminal station 3 without using the WSS 132. Since an optical signal to be output from the WSS 132 is blocked by the switch 111, the optical signal does not affect an optical signal to be output from the optical branching and coupling device 100. Consequently, even when transient transmission characteristic fluctuations occur in the WSS 132 at the time of setting transmission characteristics for the WSS 132, it is possible to suppress the fluctuations from affecting a WDM signal.

(5.4 Case that Transmission Characteristics are Simultaneously Set for WSSs 131 and 132)

Figure 14:
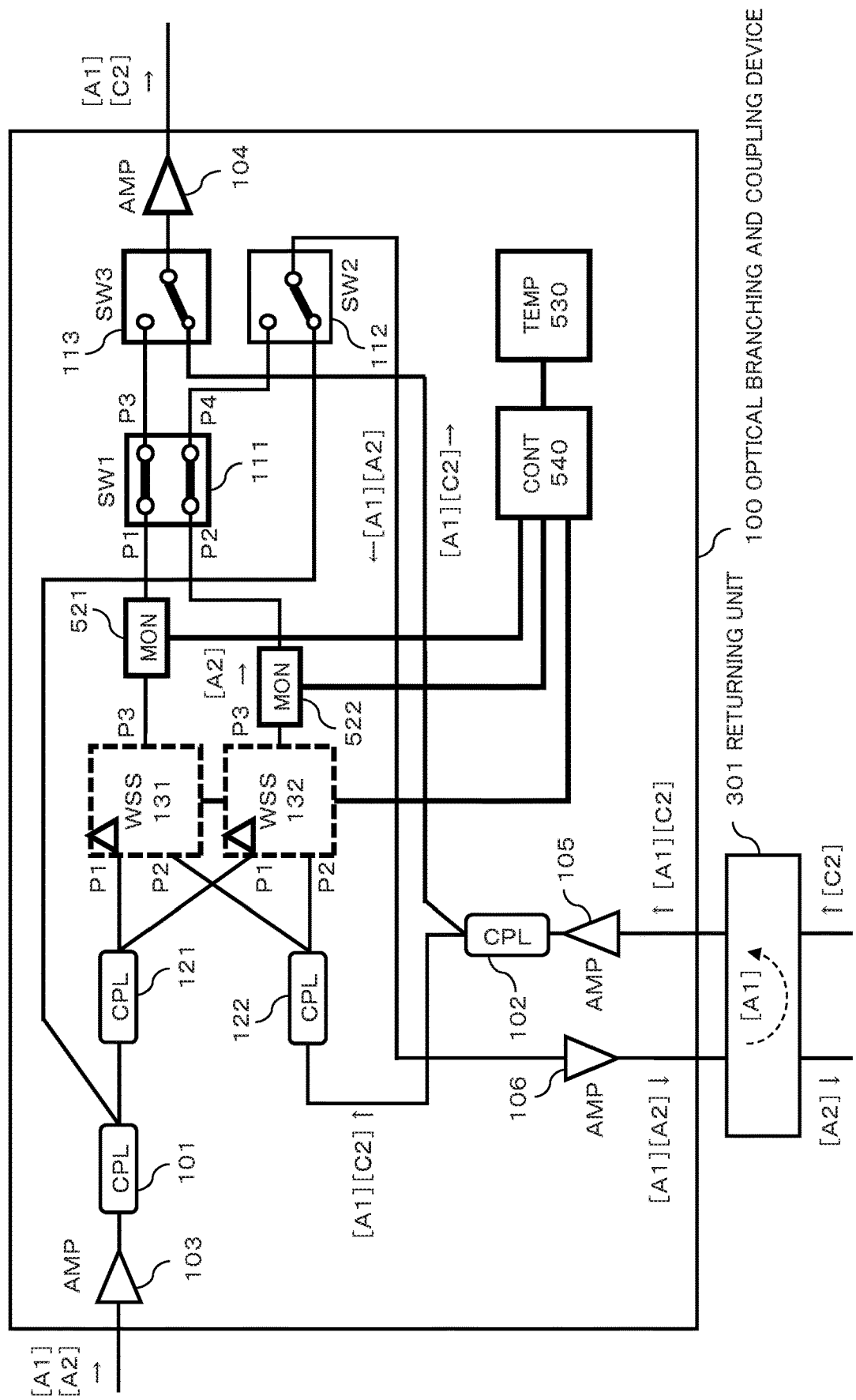
FIG. 14 is a diagram describing a case that diverts a main signal to a path that does not pass through the WSSs 131 and 132.

FIG. 14 is a diagram describing a case that a main signal is diverted to a path that does not pass through the WSSs 131 and 132, when a procedure of setting transmission characteristics is simultaneously performed for the WSSs 131 and 132. The marks "A (triangle)" appended to the WSSs 131 and 132 indicate that a procedure of setting transmission characteristics is simultaneously being performed for the WSSs 131 and 132.

In FIG. 14, the switch 112 is switched in such a way that a WDM signal ([A1][A2]) split from the coupler 101 is output from the optical branching and coupling device 100 via the optical amplifier 106. A returning unit 301 is included inside or outside of the optical branching and coupling device 100. The returning unit 301 separates the input WDM signal ([A1][A2]) into an optical signal ([M]) and an optical signal ([A2]), couples an optical signal ([C2]) input from the C terminal station 3 and the optical signal GAM, and outputs the coupled signal to the optical amplifier 105. The returning unit 301 further outputs the optical signal ([A2]) to the C terminal station 3. The returning unit 301 as described above can be easily constituted of a bandpass filter for transmitting only the optical signal ([M]) and a coupler, for example.

The coupler 102 splits a WDM signal ([A1] [C2]) output from the returning unit 301. The switch 113 switches in such a way that the WDM signal ([A1][C2]) split from the coupler 102 is output from the optical branching and coupling unit 100 via the optical amplifier 104.

In this way, also in a case of FIG. 14, by using the returning unit 301, the optical signal ([M]) and the optical signal ([C2]) are transmitted to the B terminal station 2 being a destination of both of the optical signals. Similarly, the optical signal ([A2]) is transmitted to the C terminal station 3. Specifically, the optical branching and coupling device 100 is able to transmit a WDM signal to the B terminal station 2 and the C terminal station 3 without using either the WSS 131 or the 132. Since optical signals to be output from the WSSs 131 and 132 are blocked by the switch 112 or 113, the optical signals do not affect an optical signal to be output from the optical branching and coupling device 100. Consequently, also when transmission characteristics are simultaneously set for the WSSs 131 and 132, it is possible to suppress characteristic fluctuations by setting the transmission characteristics from affecting a WDM signal.

In FIGS. 12 to 14, after transmission characteristics are set for a WSS, the switches 111 to 113 may be switched to the state of FIG. 11 at a timing that does not affect switching. Thereafter, when control of transmission characteristics of the WSS is needed again due to a temperature change of the optical branching and coupling device 100, the switches 111 to 113 may be switched in such a way that either of the states of FIGS. 12 to 14 is achieved according to a WSS being a target to be controlled.

(Modification Example of Fifth Example Embodiment)

In FIGS. 12 to 14, the control unit 540 may control in such a way that the WSS 131 or 132, for which a procedure of setting transmission characteristics is performed, outputs only an optical signal of one wavelength at the time of performing this setting. In this case, as the wavelength monitors 521 and 522, it is possible to employ the wavelength monitor 520A described in FIG. 4. The control unit 540 controls a WSS in operation (e.g. the WSS 132 in FIG. 12, and the WSS 131 in FIG. 13) to output a predetermined WDM signal. On the other hand, the control unit 540 controls a WSS (e.g. the WSS 131 in FIG. 12, and the WSS 132 in FIG. 13) for which a procedure of setting transmission characteristics is performed to change a wavelength of output light by one wavelength at a time. Also in such a configuration, the control unit 540 is able to detect, from an output of the wavelength monitor 521 or 522, wavelength characteristics of a light intensity of a WDM signal to be output from a WSS for which a procedure of setting transmission characteristics is being performed.

Sixth Example Embodiment

Figure 15:
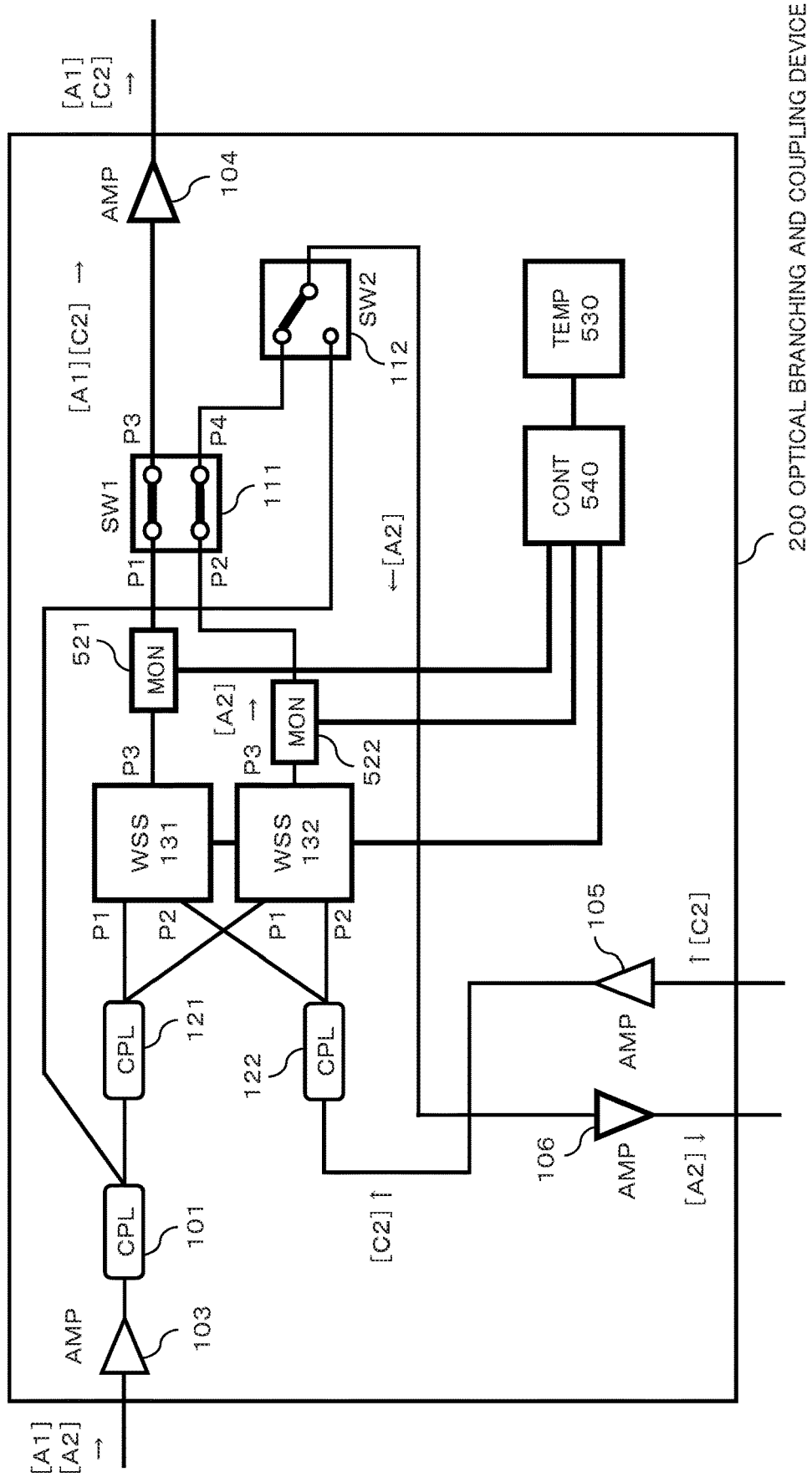
FIG. 15 is a block diagram illustrating a configuration example of an optical branching and coupling device 200 according to a sixth example embodiment.

FIG. 15 is a block diagram illustrating a configuration example of an optical branching and coupling device 200 according to a sixth example embodiment. The optical branching and coupling device 200 does not require the coupler 102 and the switch 113 included in the optical branching and coupling device 100 according to the fifth example embodiment. Since the other components are similar to those of the optical branching and coupling device 100, overlapping description with respect to the fifth example embodiment is omitted as necessary.

(6-1. Case that Setting is not Performed for WSS 131 and WSS 132)

An operation of the optical branching and coupling device 200, when a procedure of setting transmission characteristics is not being performed for a WSS 131 and a WSS 132, is described with reference to FIG. 15. A WDM signal ([A1][A2]) transmitted from a A terminal station 1 is input to the optical branching and coupling device 200, passes through an optical amplifier 103, and couplers 101 and 121, and is input to P1 of each of the WSSs 131 and 132. An optical signal ([C2]) transmitted from a C terminal station 3 passes through an optical amplifier 105 and a coupler 122, and is input to P2 of each of the WSSs 131 and 132.

The WDM signal ([A1][A2]) is input from the coupler 121 to P1 of the WSS 131. The optical signal ([C2]) is input from the coupler 122 to P2 of the WSS 131. The WSS 131 couples an optical signal ([A1]) separated from the WDM signal input to P1, and the optical signal ([C2]) input to P2, and generates a WDM signal ([A1] [C2]). The generated WDM signal ([A1] [C2]) passes through a wavelength monitor 521 from P3 of the WSS 131, and is output to P1 of a switch 111. The WDM signal ([A1] [C2]) passes through P3 of the switch 111 and an optical amplifier 104, and is transmitted to the outside (toward a B terminal station 2).

The WSS 132 outputs, from P3 of the WSS 132 to a wavelength monitor 522, an optical signal ([A2]) separated from the WDM signal ([A1][A2]) input to P1. The optical signal ([A2]) passes through the wavelength monitor 522, P2 and P4 of the switch 111, a switch 112, and an optical amplifier 106, and is transmitted to the outside (toward the C terminal station 3).

In this way, in FIG. 15, the optical signal ([A1]) transmitted from the A terminal station 1, and the optical signal ([C2]) transmitted from the C terminal station 3 are transmitted to the B terminal station 2 being a destination of each of the optical signals. The optical signal ([A2]) is transmitted to the C terminal station 3 being a destination thereof.

(6-2. Case that Transmission Characteristics are Set for WSS 131)

Figure 16:
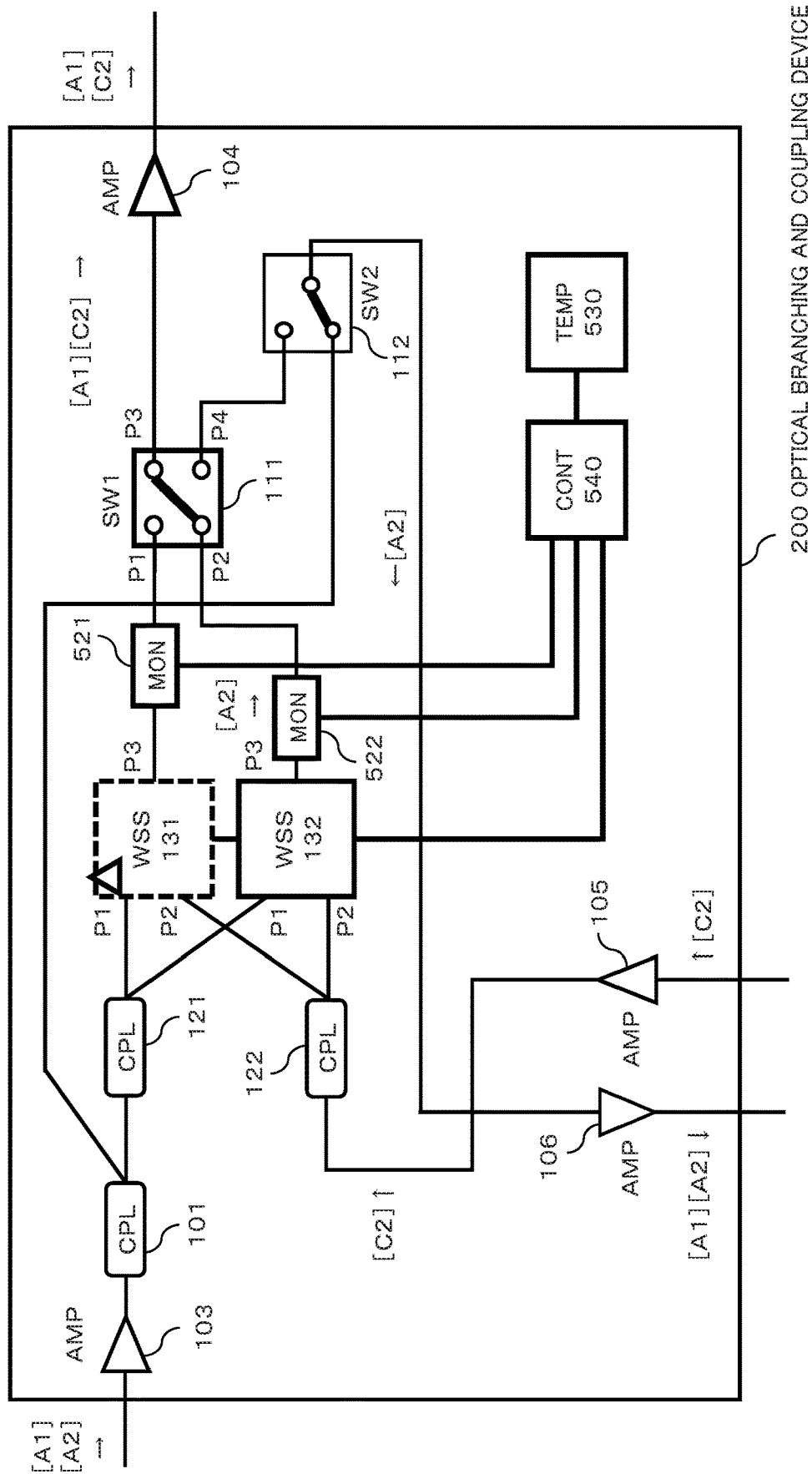
FIG. 16 is a diagram describing a case that diverts a main signal to a WSS 132.

FIG. 16 is a diagram illustrating a case that a main signal is diverted to the WSS 132, when a procedure of setting transmission characteristics is to be performed for the WSS 131 in the present example embodiment. When a procedure of setting transmission characteristics is performed for the WSS 131, the WSS 132 and the switches 111 and 112 are set in such a way as to achieve the following operation.

The WSS 132 couples an optical signal ([A1]) separated from a WDM signal ([A1][A2]) input to P1, and an optical signal ([C2]) input to P2, and generates a WDM signal ([A1][C2]). The generated WDM signal ([A1][C2]) passes through the wavelength monitor 522 from P3 of the WSS 132, and is output to P2 of the switch 111. The WDM signal ([A1] [C2]) passes through the switch 111 and the optical amplifier 104, and is transmitted to the outside (B terminal station 2).

On the other hand, in FIG. 16, the switch 112 is switched in such a way that a WDM signal ([A1][A2]) split from the coupler 101 passes through the switch 112. Consequently, the WDM signal ([A1][A2]) passes through the switch 112 and the optical amplifier 106, and is transmitted to the outside (C terminal station 3). In this case, when receiving the WDM signal ([A1][A2]), the C terminal station 3 separates and uses only an optical signal ([A2]) in which the C terminal station 3 is a destination.

In this way, when a procedure of setting transmission characteristics is performed for the WSS 131, the optical branching and coupling device 200 is able to transmit WDM signals to the B terminal station 2 and the C terminal station 3 without using the WSS 131. Consequently, even when transient transmission characteristic fluctuations occur in the WSS 131 at the time of setting transmission characteristics for the WSS 131, it is possible to suppress the fluctuations from affecting a WDM signal.

(6-3. Case that Transmission Characteristics are Set for WSS 132)

Figure 17:
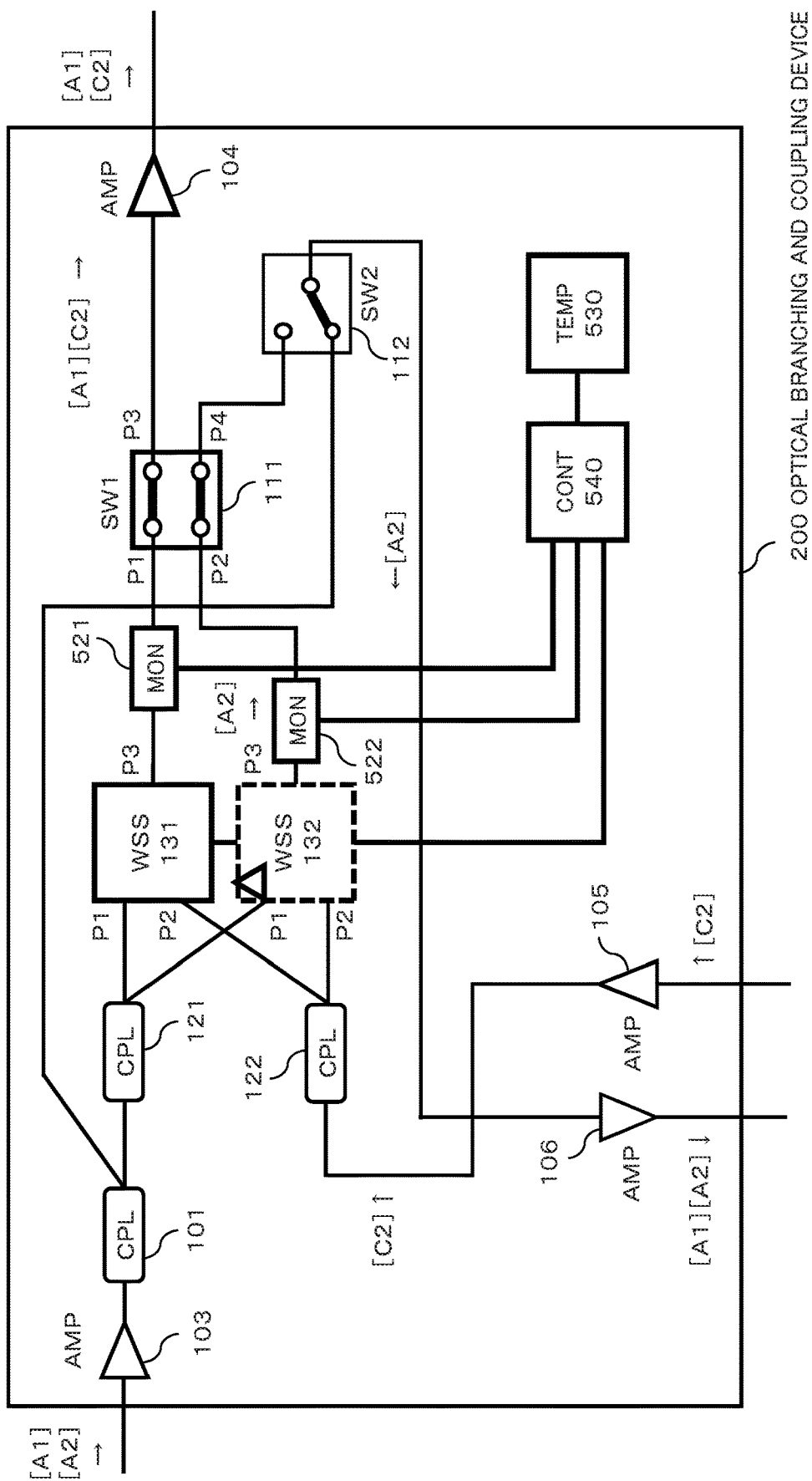
FIG. 17 is a diagram describing a case that diverts a main signal to a WSS 131.

FIG. 17 is a diagram illustrating a case that a main signal is diverted to the WSS 131, when transmission characteristics are to be set for the WSS 132 in the present example embodiment. When a procedure of setting transmission characteristics is performed for the WSS 132, the WSS 131 and the switches 111 and 112 are set in such a way as to achieve the following operation.

The WSS 131 couples an optical signal ([M]) separated from a WDM signal ([A1][A2]) that is input to P1, and an optical signal ([C2]) that is input to P2, and generates a WDM signal ([A1][C2]). The generated WDM signal ([A1][C2]) passes through the wavelength monitor 521 from P3 of the WSS 131, and is output to P1 of the switch 111. The WDM signal ([A1][C2]) passes through the switch 111 and the optical amplifier 104, and is transmitted to the outside (B terminal station 2).

On the other hand, similarly to FIG. 16, in FIG. 17, the switch 112 is switched in such a way that a WDM signal ([A1][A2]) split from the coupler 101 passes through the switch 112. Consequently, the WDM signal ([A1][A2]) passes through the switch 112 and the optical amplifier 106, and is transmitted to the outside (C terminal station 3).

In this way, similarly to FIG. 16, also in a case of FIG. 17, the optical signal ([M]) and the optical signal ([C2]) are transmitted to the B terminal station 2 being a destination of both of the optical signals. The optical signal ([A2]) is transmitted to the C terminal station 3 in a state of the WDM signal ([A1][A2]). When a procedure of setting transmission characteristics is performed for the WSS 132, the optical branching and coupling device 100 is able to transmit WDM signals to the B terminal station 2 and the C terminal station 3 without using the WSS 132. Consequently, even when transient transmission characteristic fluctuations occur in the WSS 132 at the time of setting transmission characteristics for the WSS 132, it is possible to suppress the fluctuations from affecting a WDM signal.

In FIGS. 16 to 17, after transmission characteristics are set for a WSS, the switches 111 and 112 may be switched to the state of FIG. 15 at a timing that does not affect switching. Thereafter, when control of transmission characteristics of a WSS is needed again due to a temperature change of the optical branching and coupling device 200, the switches 111 and 112 may be switched in such a way that the state of FIG. 16 or 17 is achieved according to a WSS being a target to be controlled.

As described above, similarly to the optical branching and coupling device 100, in the optical branching and coupling device 200, when a procedure of setting transmission characteristics is performed for either of the WSS 131 and the WSS 132, it is possible to configure an optical path for bypassing the WSS. Therefore, even when transient transmission characteristic fluctuations occur at the time of setting transmission characteristics for a WSS, it is possible to suppress the fluctuations from affecting a WDM signal.

As compared with the optical branching and coupling device 100, the optical branching and coupling device 200 does not require the coupler 102 and the switch 113. Therefore, the optical branching and coupling device 200 according to the sixth example embodiment enables further miniaturization and cost reduction of an optical branching and coupling device.

Also in the sixth example embodiment, a wavelength monitor 520A may be employed as wavelength monitors 521 and 522. In this case, a control unit 540 controls a WSS (e.g. the WSS 131 in FIG. 16, and the WSS 132 in FIG. 17) for which a procedure of setting transmission characteristics is performed to change a wavelength of output light by one wavelength at a time. Similarly to a case that the wavelength monitor 520A is employed in the fifth example embodiment, the control unit 540 is able to detect, from an output of the wavelength monitor 521 or 522, wavelength characteristics of a light intensity of a WDM signal to be output from a WSS, for which a procedure of setting transmission characteristics is being performed.

Seventh Example Embodiment

FIG. 18 is a block diagram illustrating a configuration example of an optical transmission system 20 according to a seventh example embodiment of the present invention. The optical transmission system 20 includes optical transmission devices 581 to 583, and terminal stations 591 and 592. In the optical transmission system 20, an optical signal transmitted from the terminal station 591 is relayed through the optical transmission devices 581 to 583 and reaches the terminal station 592.

The optical transmission devices 581 to 583 include either of the optical transmission devices 501 to 504, and the optical branching and coupling devices 100 to 200 described in the first to sixth example embodiments, and relays an optical signal transmitted from the terminal station 591. Each of the optical transmission devices 581 to 583 includes the WSS 510, the wavelength monitor 520 or 520A, the temperature monitor 530, the control unit 540, and the optical processing unit 550 as exemplified in FIG. 1. The number of optical transmission devices in FIG. 17 is not limited to three.

The control unit 540 included in each of the optical transmission devices 581 to 583 controls transmission characteristics of the WSS 510, based on a signal expressing a spectrum of output light of the WSS 510 and a signal indicating a temperature.

In the present example embodiment, the control unit 540 included in each of the optical transmission devices 581 to 583 transmits, to the terminal station 591, a signal indicating a temperature. The terminal station 591 derives a spectrum B(i) being a target of output light of the WSS 510 in the optical transmission devices 581 to 583, based on the signal indicating the temperature, which is received from the optical transmission devices 581 to 583, and notifies the optical transmission devices 581 to 583 of the derived spectrum B(i). Calculation of the spectrum B(i) may be performed not by the terminal station 591 but by the terminal station 592.

The terminal station 591 may change the spectrum B(i) that is notified to the optical transmission devices 581 to 583 to be more suitable for an overall operation of the optical transmission system 20, based on the temperature notified from the optical transmission devices 581 to 583, and notify the optical transmission devices 581 to 583 of the spectrum B(i). The control unit 540 included in each of the optical transmission devices 581 to 583 receives, from the terminal station 591, the spectrum B(i) being a target of output light of the WSS 510 of the own device, and controls transmission characteristics of the WSS 510 of the own device.

The terminal station 591 may have a function of the monitoring device 570 described in the third example embodiment. It is possible to apply, to communication between the optical transmission devices 581 to 583, and the terminal station 591, a configuration for communication between the optical transmission device 503 and the monitoring device 570, which is described in FIG. 8 of the third example embodiment and FIG. 9.

Calculation of the spectrum B(i) and notification of the spectrum B(i) to the optical transmission devices 581 to 583 may be performed by either of the optical transmission devices 581 to 583, without using the terminal station 591 and the terminal station 592. Specifically, either of the optical transmission devices 581 to 583 may have a function of the terminal station 591 relating to calculation of the spectrum B(i). Alternatively, information on a temperature to be output from the temperature monitor 530 may be exchanged among a plurality of specific optical transmission devices; and each of the optical transmission devices may calculate the spectrum B(i), based on the information of the own device and the exchanged information, and set the calculated spectrum B(i) in the WSS 510 of the own device.

The control unit 540 according to the first to seventh example embodiments may be included at any position of the optical branching and coupling devices 100 and 200. The control unit 540 may include a CPU and a storage device. The CPU achieves a function of the optical transmission device or the optical branching and coupling device according to each of the example embodiments by executing a program stored in the storage device. The storage device is a fixed non-transitory storage medium. As a recording medium, a semiconductor memory or a fixed magnetic disk device is employed, but the recording medium is not limited to these devices.

The whole or part of the example embodiments disclosed above can be described as, but not limited to, the following supplementary notes.

(Supplementary Note 1)

An optical transmission device including:

a wavelength selective switch (WSS);

a wavelength monitor that outputs a signal expressing a first spectrum being a spectrum of output light of the WSS;

an optical processing means for performing predetermined processing on output light of the WSS;

a temperature monitor that outputs a signal indicating a temperature of the optical processing means; and a control means for receiving a signal expressing the first spectrum and a signal indicating the temperature, and controlling a transmission characteristic of the WSS, based on the first spectrum and the temperature.

(Supplementary Note 2)

The optical transmission device according to supplementary note 1, wherein the control means derives, based on the temperature, a second spectrum being a spectrum of input light to the optical processing means and allowing a spectrum of output light of the optical processing means to have a predetermined characteristic, and controls the transmission characteristic of the WSS, based on the first spectrum and the second spectrum.

(Supplementary Note 3)

The optical transmission device according to supplementary note 2, wherein the control means includes a table in which a temperature characteristic of a spectrum of output light of the optical processing means is recorded, derives the second spectrum, based on the temperature characteristic, and controls the transmission characteristic of the WSS in such a way that the first spectrum and the second spectrum coincide with each other.

(Supplementary Note 4)

The optical transmission device according to supplementary note 3, wherein the second spectrum is derived as a reverse characteristic of the temperature characteristic.

(Supplementary Note 5)

The optical transmission device according to any one of supplementary notes 1 to 4, wherein the control means controls in such a way as to successively switch a wavelength of output light of the WSS, and the wavelength monitor outputs, as the first spectrum, a signal indicating an intensity of the output light of a switched wavelength.

(Supplementary Note 6)

The optical transmission device according to any one of supplementary notes 1 to 5, wherein the optical processing means is an optical amplifier.

(Supplementary Note 7)

The optical transmission device according to any one of supplementary notes 1 to 6, further including a plurality of the WSSs having a redundant configuration, wherein the WSS, of which the transmission characteristic is controlled, is set to a standby state.

(Supplementary Note 8)

The optical transmission device according to supplementary note 1, wherein the control means transmits, to an external device of the optical transmission device, a signal indicating the temperature, and controls the transmission characteristic of the WSS, based on a notification from the external device.

(Supplementary Note 9)

An optical transmission system including:

the optical transmission device according to supplementary note 8; and the external device that includes a table in which a temperature characteristic of a spectrum of output light of the optical processing means is recorded, derives, based on a signal indicating the temperature and the temperature characteristic, a second spectrum being a spectrum of input light to the optical processing means and allowing a spectrum of output light of the optical processing means to have a predetermined characteristic, and notifies the optical transmission device of the second spectrum.

(Supplementary Note 10)

The optical transmission system according to supplementary note 9, wherein the external device is communicably connected to a plurality of the optical transmission devices, and the external device notifies each of the optical transmission devices of the second spectrum, based on a signal indicating the temperature, the signal being received from each of the optical transmission devices.

(Supplementary Note 11)

A control method for an optical transmission device, including:

outputting a signal expressing a first spectrum being a spectrum of output light of a wavelength selective switch (WSS);

performing predetermined processing on output light of the WSS by using an optical processing means;

outputting a signal indicating a temperature of the optical processing means; and controlling a transmission characteristic of the WSS, based on the first spectrum and the temperature.

(Supplementary Note 12)

The control method for the optical transmission device according to supplementary note 11, wherein the controlling the transmission characteristic of the WSS includes deriving, based on the temperature, a second spectrum being a spectrum of input light to the optical processing means and allowing a spectrum of output light of the optical processing means to have a predetermined characteristic, and controlling the transmission characteristic of the WSS, based on the first spectrum and the second spectrum.

(Supplementary Note 13)

The control method for the optical transmission device according to supplementary note 12, wherein the controlling the transmission characteristic of the WSS includes deriving the second spectrum, based on a temperature characteristic of a spectrum of output light of the optical processing means, and controlling the transmission characteristic of the WSS in such a way that the first spectrum and the second spectrum coincide with each other.

(Supplementary Note 14)

The control method for the optical transmission device according to supplementary note 13, wherein the second spectrum is derived as a reverse characteristic of the temperature characteristic.

(Supplementary Note 15)

The control method for the optical transmission device according to any one of supplementary notes 11 to 14, wherein the controlling the transmission characteristic of the WSS includes controlling in such a way as to successively switch a wavelength of output light of the WSS, and setting, as the first spectrum, a signal indicating an intensity of the output light of a switched wavelength.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims. This application is based upon and claims the benefit of priority from Japanese patent application No. 2018-045090, filed on Mar. 13, 2018, the disclosure of which is incorporated herein in its entirety by reference.

REFERENCE SIGNS LIST

1 A terminal station
2 B terminal station
3 C terminal station
4 Amplifier
5 Undersea cable 10 Undersea cable system
100, 200 Optical branching and coupling device
101, 102, 121, 122, 524 Coupler
103 to 106 Optical amplifier
111, 112, 113 Switch
301 Returning unit
501 to 504, and 581 to 583 Optical transmission device
131, 132, 510 WSS
520, 521, 522 Wavelength monitor
525 Filter
526 Photo detector
530 Temperature monitor
540 Control unit
550 Optical processing unit
551 Optical amplifier
570 Monitoring device
591, 592 Terminal station

The invention claimed is:

1. An optical transmission device comprising:
a wavelength selective switch (WSS);
a wavelength monitor configured to output a signal expressing a first spectrum being a spectrum of output light of the WSS;
an optical processor configured to perform predetermined processing on output light of the WSS;
a temperature monitor configured to output a signal indicating a temperature of the optical processor; and
a controller configured to receive a signal expressing the first spectrum and a signal indicating the temperature, and control a transmission characteristic of the WSS, based on the first spectrum and the temperature.

2. The optical transmission device according to claim 1, wherein
the controller
derives, based on the temperature, a second spectrum being a spectrum of input light to the optical processor and allowing a spectrum of output light of the optical processor to have a predetermined characteristic, and
controls the transmission characteristic of the WSS, based on the first spectrum and the second spectrum.

3. The optical transmission device according to claim 2, wherein
the controller
includes a table in which a temperature characteristic of a spectrum of output light of the optical processor is recorded,
derives the second spectrum, based on the temperature characteristic, and
controls the transmission characteristic of the WSS in such a way that the first spectrum and the second spectrum coincide with each other.

4. The optical transmission device according to claim 3, wherein the second spectrum is derived as a reverse characteristic of the temperature characteristic.

5. The optical transmission device according to claim 2, wherein
the controller controls in such a way as to successively switch a wavelength of output light of the WSS, and
the wavelength monitor outputs, as the first spectrum, a signal indicating an intensity of the output light of a switched wavelength.

6. The optical transmission device according to claim 2, wherein
the optical processor is an optical amplifier.

7. The optical transmission device according to claim 2, further comprising
a plurality of the WSSs having a redundant configuration, wherein
the WSS, of which the transmission characteristic is controlled, is set to a standby state.

8. The optical transmission device according to claim 1, wherein
the controller controls in such a way as to successively switch a wavelength of output light of the WSS, and
the wavelength monitor outputs, as the first spectrum, a signal indicating an intensity of the output light of a switched wavelength.

9. The optical transmission device according to claim 1, wherein the optical processor is an optical amplifier.

10. The optical transmission device according to claim 1, further comprising
a plurality of the WSSs having a redundant configuration, wherein
the WSS, of which the transmission characteristic is controlled, is set to a standby state.

11. The optical transmission device according to claim 1, wherein
the controller transmits, to an external device of the optical transmission device, a signal indicating the temperature, and controls the transmission characteristic of the WSS, based on a notification from the external device.

12. An optical transmission system comprising:
the optical transmission device according to claim 11; and
the external device that includes a table in which a temperature characteristic of a spectrum of output light of the optical processor is recorded, derives, based on a signal indicating the temperature and the temperature characteristic, a second spectrum being a spectrum of input light to the optical processor and allowing a spectrum of output light of the optical processor to have a predetermined characteristic, and notifies the optical transmission device of the second spectrum.

13. The optical transmission system according to claim 12, wherein
the external device is communicably connected to a plurality of the optical transmission devices, and
the external device notifies each of the optical transmission devices of the second spectrum, based on a signal indicating the temperature, the signal being received from each of the optical transmission devices.

14. A control method for an optical transmission device, comprising:
outputting a signal expressing a first spectrum being a spectrum of output light of a wavelength selective switch (WSS);
performing predetermined processing on output light of the WSS by using an optical processor;
outputting a signal indicating a temperature of the optical processor; and
controlling a transmission characteristic of the WSS, based on the first spectrum and the temperature.

15. The control method for the optical transmission device according to claim 14, wherein
the controlling the transmission characteristic of the WSS includes
deriving, based on the temperature, a second spectrum being a spectrum of input light to the optical processor and allowing a spectrum of output light of the optical processor to have a predetermined characteristic, and
controlling the transmission characteristic of the WSS, based on the first spectrum and the second spectrum.

16. The control method for the optical transmission device according to claim 15, wherein
the controlling the transmission characteristic of the WSS includes
deriving the second spectrum, based on a temperature characteristic of a spectrum of output light of the optical processor, and
controlling the transmission characteristic of the WSS in such a way that the first spectrum and the second spectrum coincide with each other.

17. The control method for the optical transmission device according to claim 16, wherein
the second spectrum is derived as a reverse characteristic of the temperature characteristic.

18. The control method for the optical transmission device according to claim 15, wherein
the controlling the transmission characteristic of the WSS includes
controlling in such a way as to successively switch a wavelength of output light of the WSS, and
setting, as the first spectrum, a signal indicating an intensity of the output light of a switched wavelength.

19. The control method for the optical transmission device according to claim 14, wherein
the controlling the transmission characteristic of the WSS includes
controlling in such a way as to successively switch a wavelength of output light of the WSS, and
setting, as the first spectrum, a signal indicating an intensity of the output light of a switched wavelength.

* * * * *